(12) United States Patent
Weston et al.

(10) Patent No.: US 12,466,390 B2
(45) Date of Patent: Nov. 11, 2025

(54) METHODS, SYSTEMS, APPARATUS, AND ARTICLES OF MANUFACTURE TO DETERMINE THRESHOLD SPEED FOR A VEHICLE AND TRAILER

(71) Applicant: Ford Global Technologies, LLC, Dearborn, MI (US)

(72) Inventors: Keith Weston, Canton, MI (US); Andrew Denis Lewandowski, Sterling Heights, MI (US); Brendan Diamond, Grosse Pointe, MI (US); Jordan Barrett, Milford, MI (US); Matthew Johnson, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 18/169,604

(22) Filed: Feb. 15, 2023

(65) Prior Publication Data
US 2024/0270234 A1    Aug. 15, 2024

(51) Int. Cl.
*B60W 30/14*     (2006.01)
*B60W 10/06*     (2006.01)
(Continued)

(52) U.S. Cl.
CPC ............ *B60W 30/02* (2013.01); *B60W 10/06* (2013.01); *B60W 10/08* (2013.01); *B60W 10/184* (2013.01); *B60W 30/146* (2013.01); *B60W 50/12* (2013.01); *B60W 50/14* (2013.01); *B60W 60/0015* (2020.02); *G06N 20/00* (2019.01); *B60W 2520/00* (2013.01); *B60W 2554/408* (2020.02); *B60W 2555/20* (2020.02)

(58) Field of Classification Search
None
See application file for complete search history.

(56) References Cited

U.S. PATENT DOCUMENTS 9,676,377 B2    6/2017  Hafner et al.
9,744,972 B2 *  8/2017  Trombley ....... B60W 30/18036
(Continued)

FOREIGN PATENT DOCUMENTS

GB    2518857    4/2015

OTHER PUBLICATIONS

United States Patent and Trademark Office, "Notice of Allowance and Fee(s) Due," issued in connection with U.S. Appl. No. 17/970,277, dated Dec. 4, 2024, 9 pages.

(Continued)

*Primary Examiner* — Daniel L Greene
*Assistant Examiner* — Robert L Pinkerton
(74) *Attorney, Agent, or Firm* — Lorne Forsythe; Hanley, Flight & Zimmerman, LLC

(57) ABSTRACT

Methods, systems, apparatus, and articles of manufacture to determine threshold speed for a vehicle and trailer are disclosed. An example apparatus disclosed herein includes memory, instructions, and programmable circuitry to execute the instructions to access information associated with at least one of a vehicle or a trailer coupled to the vehicle, determine, by executing a model based on the information, a threshold speed for the vehicle and the trailer, and prevent, by activating at least one vehicle control, the vehicle and the trailer from travelling at or above the threshold speed.

20 Claims, 9 Drawing Sheets

(51) Int. Cl.
　　　*B60W 10/08*　　　(2006.01)
　　　*B60W 10/184*　　(2012.01)
　　　*B60W 30/02*　　　(2012.01)
　　　*B60W 50/12*　　　(2012.01)
　　　*B60W 50/14*　　　(2020.01)
　　　*B60W 60/00*　　　(2020.01)
　　　*G06N 20/00*　　　(2019.01)

(56) References Cited

U.S. PATENT DOCUMENTS

| | | | |
|---|---|---|---|
| 9,849,910 | B2 | 12/2017 | Hoel et al. |
| 9,981,662 | B2 | 5/2018 | Lavoie et al. |
| 11,077,845 | B2* | 8/2021 | Shalev-Shwartz ...... G01S 17/58 |
| 11,155,133 | B2* | 10/2021 | Niewiadomski ....... B60D 1/366 |
| 11,440,585 | B2 | 9/2022 | Lavoie et al. |
| 11,827,231 | B2* | 11/2023 | Lin ....................... B60W 10/08 |
| 2008/0172163 | A1 | 7/2008 | Englert |
| 2016/0101810 | A1 | 4/2016 | Xu |
| 2018/0127024 | A1 | 5/2018 | Pourrezaei Khaligh |
| 2019/0001944 | A1 | 1/2019 | Ying |
| 2019/0299946 | A1* | 10/2019 | Miller, Jr. ................. B60T 8/38 |
| 2020/0057453 | A1* | 2/2020 | Laws ................... G05D 1/0088 |
| 2022/0203999 | A1 | 6/2022 | Lin |
| 2022/0410894 | A1* | 12/2022 | Foster ................. G06V 20/588 |
| 2023/0064300 | A1 | 3/2023 | McGrory |

OTHER PUBLICATIONS

United States Patent and Trademark Office, "Non-FInal Office Action," issued in connection with U.S. Appl. No. 17/970,277, dated Jun. 20, 2024, 12 pages.

* cited by examiner

METHODS, SYSTEMS, APPARATUS, AND ARTICLES OF MANUFACTURE TO DETERMINE THRESHOLD SPEED FOR A VEHICLE AND TRAILER

FIELD OF THE DISCLOSURE

This disclosure relates generally to vehicles and, more particularly, to methods, systems, apparatus, and articles of manufacture to determine threshold speed for a vehicle and trailer.

BACKGROUND

A trailer can be coupled to a vehicle to increase a hauling capacity of the vehicle. In some cases, a combination of the vehicle and the trailer can have different steering and/or maneuvering capabilities compared to the vehicle alone. Accordingly, a travel speed of the vehicle and the trailer can be reduced to improve maneuverability of the vehicle and the trailer.

Figure 1:
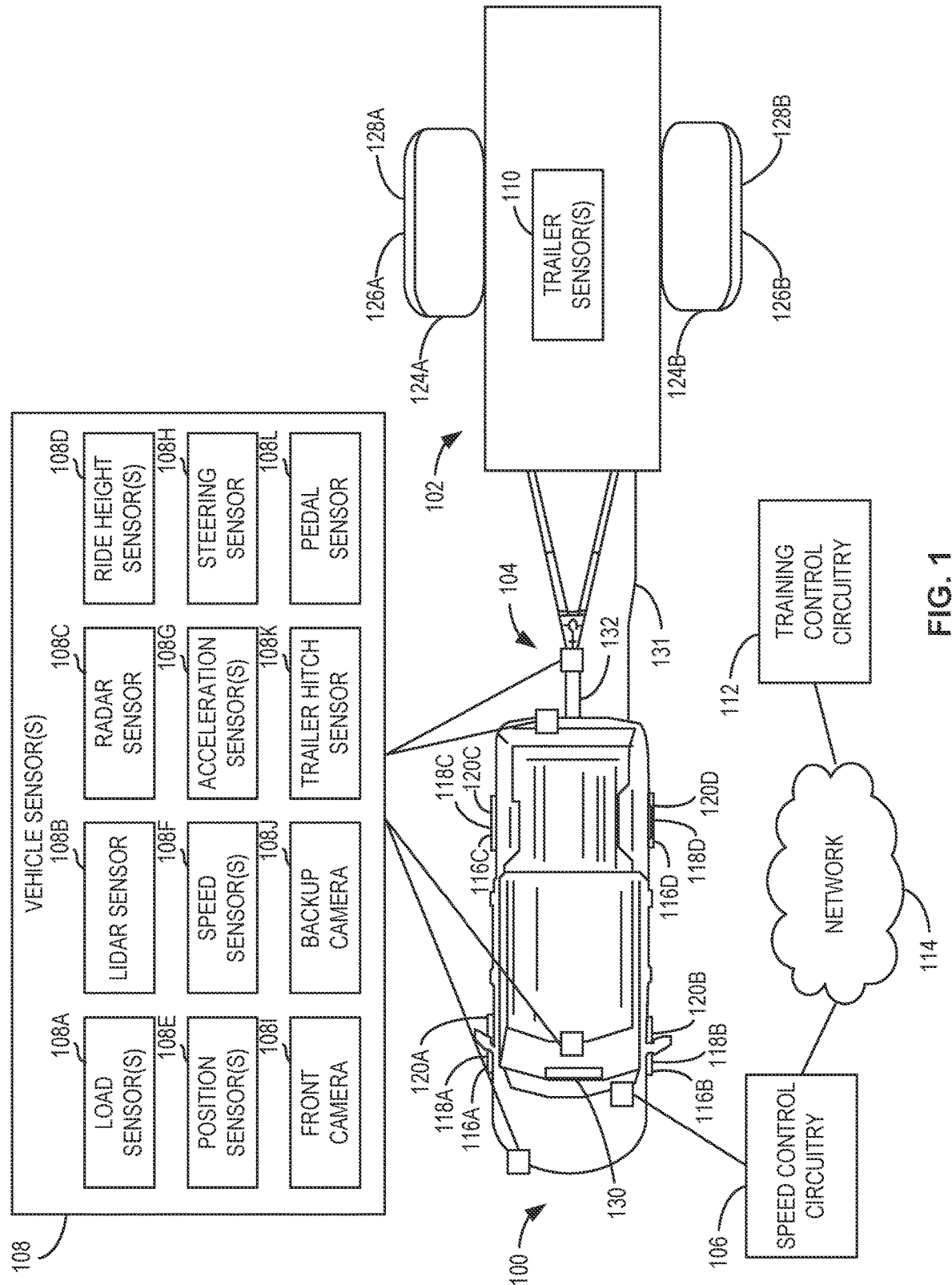
FIG. 1 illustrates an example vehicle and an example trailer coupled thereto, where the vehicle implements example speed control circuitry in accordance with teachings of this disclosure.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

A trailer can be coupled to a vehicle to increase a hauling capacity of the vehicle. The trailer is commonly coupled to the vehicle at an attachment point on a tongue of the vehicle. During vehicle travel, the trailer can pivot and/or rotate relative to the vehicle about the attachment point to enable turning of the vehicle and the trailer. In some cases, external forces (e.g., wind on a side of the trailer, uneven terrain, etc.) may cause the trailer to unintentionally pivot relative to the vehicle, thus resulting in trailer sway. The trailer may also experience oversteer and/or understeer in response to sudden and/or sharp turns of the vehicle. As disclosed herein, "understeer" refers to a tendency of the vehicle to turn less than an amount commanded by an operator of the vehicle, resulting in a larger turn radius of the vehicle. Conversely, "oversteer" refers to a tendency of the vehicle to turn more than the amount commanded by the operator, resulting in a smaller turn radius of the vehicle. In some cases, trailer sway, oversteer, and/or understeer is more likely to occur when the vehicle and the trailer are travelling at a speed that is above a threshold speed. Further, operating the vehicle and the trailer above the threshold speed increases a stopping distance of the vehicle and trailer.

In some cases, reducing a speed of the vehicle and the trailer can reduce likelihood of trailer sway, oversteer, and/or understeer. However, typical driver assistance systems (e.g., cruise control systems) do not modify vehicle speeds settings and/or limit a threshold speed (e.g., a maximum speed) of the vehicle when towing the trailer. Instead, typical driver assistance systems rely on the operator of the vehicle to select and/or modify the speed at which the vehicle is to travel. In some cases, the threshold speed at which trailer sway, understeer, and/or oversteer is likely to occur may vary based on parameters such as trailer dimensions, trailer weight, environmental conditions, etc.

Examples disclosed herein utilize calibrated models to determine a threshold speed (e.g., a maximum recommended speed) for a vehicle and a trailer coupled thereto. Example programmable circuitry disclosed herein can be implemented by the vehicle and pre-loaded with a model (e.g., a calibrated model, a trained model) for use in determining the threshold speed. In some examples, the model can include at least one of a linear regression model, a machine learning model, or a long short-term memory (LSTM) network model trained based on historical data from the vehicle and/or one or more second vehicles communicatively coupled to the vehicle. In some examples, the programmable circuitry accesses and/or obtains sensor data from one or more vehicle sensors implemented on the vehicle and/or one or more trailer sensors implemented on the trailer. In some examples, the programmable circuitry executes the model using the sensor data and/or other external input data (e.g., from one or more second vehicles communicatively coupled to the vehicle), and determines a threshold speed for the vehicle and the trailer based on an output of the executed model. In some examples, the programmable circuitry adjusts the threshold speed based on current conditions (e.g., traffic conditions, weather type, ambient temperature, etc.) of the vehicle and the trailer.

In examples disclosed herein, the programmable circuitry prevents the vehicle and the trailer from travelling at or above the threshold speed by activating one or more vehicle controls (e.g., a vehicle brake, a trailer brake, a vehicle motor, and/or a trailer motor). Additionally or alternatively, the programmable circuitry causes a user interface of the vehicle to indicate the threshold speed to an operator of the vehicle. In some such examples, the operator can manually drive the vehicle and the trailer based on the threshold speed. Advantageously, by preventing a vehicle and trailer from travelling at or above a threshold speed, examples disclosed herein prevent and/or reduce likelihood of trailer sway, understeer, and/or oversteer, thereby improving maneuverability of the vehicle and the trailer.

FIG. 1 illustrates an example vehicle 100 and an example trailer 102 coupled to the vehicle 100 via an example trailer hitch 104. In this example, the vehicle 100 implements example speed control circuitry 106 in accordance with teachings of this disclosure. In some examples, the speed control circuitry 106 determines a threshold speed (e.g., a maximum speed) for the vehicle 100 and the trailer 102 based on sensor data from one or more example vehicle sensors 108 implemented by the vehicle 100 and/or one or more example trailer sensors 110 implemented by the trailer 102. Further, the speed control circuitry 106 is communicatively coupled to example training control circuitry 112 via an example network 114, where the training control circuitry 112 generates and/or trains one or more models to be used by the speed control circuitry 106 to determine the threshold speed. In some examples, the training control circuitry 112 is included in the speed control circuitry 106 and/or implemented by the vehicle 100.

In the illustrated example of FIG. 1, the vehicle 100 includes example vehicle wheels 116 (e.g., including example front vehicle wheels 116A, 116B and example rear vehicle wheels 116C, 116D) having corresponding example vehicle brakes 118 (e.g., including example front vehicle brakes 118A, 118B and example rear vehicle brakes 118C, 118D) operatively coupled thereto. Further, example vehicle motors 120 (e.g., including example front vehicle motors 120A, 120B and example rear vehicle motors 120C, 120D) are operatively coupled to respective ones of the vehicle wheels 116 to cause rotation thereof. While four of the vehicle motors 120 are used in this example, a different number and/or arrangement of the vehicle motors 120 may be used instead. In this example, the vehicle motors 120 are electrically powered. In some examples, the vehicle wheels 116 can be driven by a gas-powered acceleration system of the vehicle 100 (e.g., in addition to or instead of the vehicle motors 120). In this example, the vehicle 100 further includes an example user interface 130, where the user interface 130 can include a display.

In the illustrated example, the trailer 102 includes example trailer wheels 124A, 124B having example trailer brakes 126A, 126B and example trailer motors 128A, 128B operatively coupled thereto. In this example, an example trailer harness (e.g., a wire connector) 131 is coupled between the vehicle 100 and the trailer 102. In some examples, the trailer harness 131 electrically couples electronics (e.g., the trailer sensors 110) of the trailer 102 to the speed control circuitry 106 such that information can be communicated therebetween.

In the illustrated example of FIG. 1, the speed control circuitry 106 obtains and/or accesses sensor data from one or more of the vehicle sensors 108. In this example, the vehicle sensors 108 include one or more example load sensors 108A, an example lidar sensor 108B, an example radar sensor 108C, example ride height sensors 108D, example position sensors 108E, example speed sensors 108F, example acceleration sensors 108G, an example steering sensor 108H, an example front camera 108I, an example backup camera (e.g., a rear camera) 108J, an example trailer hitch sensor 108K, and one or more example pedal sensors 108L.

In some examples, the load sensors 108A measure loads on the vehicle 100 at different locations of the vehicle 100. For example, the load sensors 108A can measure loads at one or more of the vehicle wheels 116. Similarly, the trailer hitch sensor 108K can measure loads from the trailer 102 on an example vehicle tongue 132 of the vehicle 100. In some examples, the measured loads from the load sensors 108A and/or the trailer hitch sensor 108K can be provided in the sensor data to the speed control circuitry 106.

In some examples, the lidar sensor 108B, the radar sensor 108C, and/or the backup camera 108J can be used to detect dimensions (e.g., height, width, and/or length) and/or a shape (e.g., a profile) of the trailer 102. Further, the lidar sensor 108B, the radar sensor 108C, and/or the backup camera 108J can detect a position of the trailer 102 relative to the vehicle 100. In some examples, the speed control circuitry 106 can determine, based on the detected position of the trailer 102 relative to the vehicle 100 at different points in time, a yaw rate of the trailer 102, where the yaw rate can be used to determine whether trailer sway is occurring. In this example, the front camera 108I can capture images corresponding to a projected path of the vehicle 100. In some examples, the speed control circuitry 106 can determine a surface type of the projected path and/or can detect upcoming curves and/or turns in the projected path based on the captured images.

In some examples, the positions sensors 108E, the speed sensors 108F, and the acceleration sensors 108G detect a position, speed, and acceleration of the vehicle 100, respectively. For example, the position sensors 108E can include a global positioning system (GPS) to determine a position (e.g., a geographic location) of the vehicle 100. In some examples, the acceleration sensors 108G can measure a lateral acceleration and/or a longitudinal acceleration of the vehicle 100. In some examples, the ride height sensors 108D can measure a ride height (e.g., a distance between the vehicle 100 and an underlying road surface) of the vehicle 100 at one or more locations of the vehicle 100. In some examples, the speed control circuitry 106 can determine a pitch angle and/or a roll angle of the vehicle 100 based on the measured ride height values from the ride height sensors 108D. In some examples, one or more of the position sensors 108E are configured to measure the pitch angle and/or the roll angle of the vehicle 100 directly.

In some examples, the steering sensor 108H measures a rotation angle of a steering wheel of the vehicle 100. In some examples, the speed control circuitry 106 can determine that the vehicle 100 is approaching and/or travelling along a curve based on the measured rotation angle of the steering wheel. In some examples, the example pedal sensor 108L detects a position of a pedal (e.g., a brake pedal and/or an acceleration pedal) of the vehicle 100, where the speed control circuitry 106 can determine whether the pedal is engaged based on the detected position. In the illustrated example of FIG. 1, the example trailer sensors 110 can include one or more load sensors to measure a load (e.g., a weight) on the trailer 102. In some examples, the speed control circuitry 106 obtains the measured load values from the trailer sensors 110 via the trailer harness 131.

In some examples, the speed control circuitry 106 obtains additional input data (e.g., external input data) via one or more network communications. For example, the speed control circuitry 106 can be communicatively coupled to one or more second vehicles via the network 114, such that the speed control circuitry 106 can obtain sensor data collected by sensors of the one or more second vehicles. In some examples, the speed control circuitry 106 can obtain traffic condition information from the second vehicles, where the traffic condition information can include a number and/or speed of vehicles travelling on a particular stretch of road. In some examples, the speed control circuitry 106 can obtain environmental information from the second vehicles and/or from physical infrastructure (e.g., weather monitoring stations) communicatively coupled to the speed control circuitry 106 via the network 114. In some examples, the environmental information can include a weather type (e.g., rainy, sunny, etc.), ambient temperature, wind speed, and/or wind direction associated with one or more geographic locations.

Figure 2:
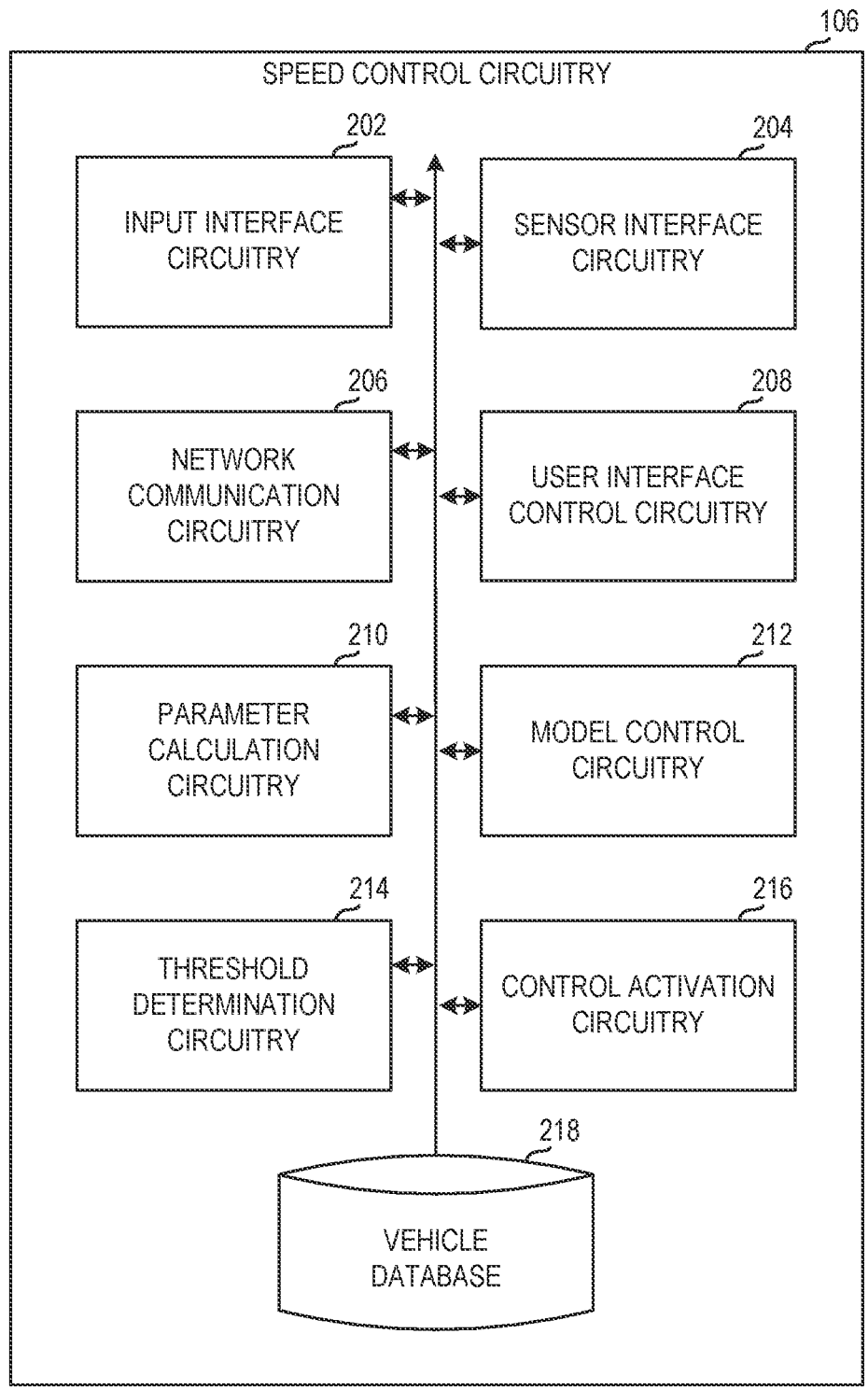
FIG. 2 is a block diagram of the example speed control circuitry of FIG. 1.

FIG. 2 is a block diagram of the example speed control circuitry 106 of FIG. 1. The speed control circuitry 106 of FIG. 2 may be instantiated (e.g., creating an instance of, bring into being for any length of time, materialize, implement, etc.) by processor circuitry such as a central processing unit executing instructions. Additionally or alternatively, the speed control circuitry 106 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

In the illustrated example of FIG. 2, the speed control circuitry 106 includes example input interface circuitry 202, example sensor interface circuitry 204, example network communication circuitry 206, example user interface control circuitry 208, example parameter calculation circuitry 210, example model control circuitry 212, example threshold determination circuitry 214, example control activation circuitry 216, and an example vehicle database 218.

The example vehicle database 218 stores data utilized and/or obtained by the speed control circuitry 106. The example vehicle database 218 of FIG. 2 is implemented by any memory, storage device and/or storage disc for storing data such as, for example, flash memory, magnetic media, optical media, solid state memory, hard drive(s), thumb drive(s), etc. Furthermore, the data stored in the example vehicle database 218 may be in any data format such as, for example, binary data, comma delimited data, tab delimited data, structured query language (SQL) structures, etc. While, in the illustrated example, the example vehicle database 218 is illustrated as a single device, the example vehicle database 218 and/or any other data storage devices described herein may be implemented by any number and/or type(s) of memories.

The example input interface circuitry 202 obtains and/or accesses input data from the trailer 102 and/or one or more additional sources. For example, the input interface circuitry 202 is communicatively coupled to the example trailer sensors 110 of FIG. 1 via the example trailer harness 131. In some examples, the input interface circuitry 202 obtains trailer sensor data obtained by the trailer sensors 110, where the trailer sensor data can include a load on the trailer 102 at one or more locations of the trailer 102. In some examples, the input interface circuitry 202 can receive input data from a mobile device communicatively coupled to the input interface circuitry 202 via a wired connection and/or a Bluetooth connection. In some examples, the mobile device can be used to scan a code (e.g., a quick response (QR) code, a barcode) located on the trailer 102 and obtain trailer information based on the scanned code. In some examples, the trailer information can include dimensions (e.g., a height, length, and/or width) of the trailer 102, weight of the trailer 102, a maximum recommended load on the trailer 102, and/or a maximum recommended speed for the trailer 102. In some examples, the mobile device provides the trailer information to the input interface circuitry 202. In some examples, the input interface circuitry 202 provides the trailer sensor data and/or the trailer information to the vehicle database 218 for storage therein. In some examples, the input interface circuitry 202 is instantiated by processor circuitry executing input interface circuitry instructions and/or configured to perform operations such as those represented by the flowchart of FIG. 4.

The example sensor interface circuitry 204 obtains and/or accesses sensor data (e.g., vehicle sensor data) from one or more of the vehicle sensors 108 of FIG. 1. For example, the sensor interface circuitry 204 obtains, from the load sensors 108A, example load data representing loads at one or more locations (e.g., the vehicle wheels 116) of the vehicle 100. In some examples, the sensor interface circuitry 204 obtains, from the trailer hitch sensor 108K, example tongue load data representing a load of the trailer 102 on the vehicle tongue 132 of the vehicle 100. In some examples, the sensor interface circuitry 204 obtains example position data from the position sensors 108E, example speed data from the speed sensors 108F, and/or example acceleration data from the acceleration sensors 108G. In some examples, the sensor interface circuitry 204 obtains images captured by the front camera 108I and the backup camera 108J, where the images represent an environment of the vehicle 100. Additionally or alternatively, the sensor interface circuitry 204 obtains data representative of one or more objects surrounding the vehicle 100 from the lidar sensor 108B and/or the radar sensor 108C. In some examples, the sensor interface circuitry 204 obtains ride height data from the ride height sensors 108D, where the ride height data represents a distance between the vehicle 100 and an underlying road surface at one or more locations of the vehicle 100. In some examples, the sensor interface circuitry 204 obtains steering angle data from the steering sensor 108H, where the steering angle data represents an angle and/or a direction of turning of a steering wheel of the vehicle 100. In some examples, the sensor interface circuitry 204 obtains, from the pedal sensor 108L, pedal position data representing positions of one or more pedals (e.g., a gas pedal and/or an acceleration pedal) of the vehicle 100. In some examples, the sensor interface circuitry 204 provides the sensor data to the vehicle database 218 for storage therein. In some examples, the sensor interface circuitry 204 is instantiated by processor circuitry executing sensor interface circuitry instructions and/or configured to perform operations such as those represented by the flowchart of FIG. 4.

The network communication circuitry 206 sends and/or receives one or more network communications via the network 114 of FIG. 1. For example, the network communication circuitry 206 can receive network communications from one or more second vehicles and/or from physical infrastructure communicatively coupled to the network communication circuitry 206. In some examples, the received network communications include sensor data, traffic condition information, and/or environmental information from the one or more second vehicles and/or from the physical infrastructure. In some examples, the network communication circuitry 206 provides the received data to the vehicle database 218 for storage therein. In some examples, the network communication circuitry 206 provides the sensor data obtained by the sensor interface circuitry 204 to the one or more second vehicles and/or to the example training control circuitry 112 of FIG. 1 for use in training and/or re-training one or more models. In some examples, the network communication circuitry 206 is instantiated by processor circuitry executing network communication circuitry instructions and/or configured to perform operations such as those represented by the flowchart of FIG. 4.

The example user interface control circuitry 208 controls the example user interface 130 implemented in the vehicle 100. In some examples, the user interface 130 includes a display (e.g., a human machine interface (HMI) display) that can provide visual and/or audio indications to an operator of the vehicle 100, and/or can accept user input from the operator. In some examples, the user interface control circuitry 208 presents, via the user interface 130, one or more controls to the operator. In some examples, the operator can select and/or adjust, via user input, the one or more controls to switch between a manual driving mode and an autonomous driving mode of the vehicle 100. In some examples, the user interface control circuitry 208 can cause the user interface 130 to present at least one of a visual indication or an audio indication to indicate a threshold speed to the operator, and/or inform the operator when a current speed of the vehicle 100 is greater than the threshold speed. For example, the user interface control circuitry 208 can cause the visual indication of the threshold speed to blink, flash, and/or change color when the current speed of the vehicle 100 is greater than the threshold speed. In some examples, the user interface control circuitry 208 is instantiated by processor circuitry executing user interface control circuitry instructions and/or configured to perform operations such as those represented by the flowchart of FIG. 4.

The parameter calculation circuitry 210 calculates one or more parameters based on the sensor data and/or other input data obtained by the speed control circuitry 106. In some examples, the parameters include at least one of a yaw angle, a yaw angle rate, a pitch angle, a pitch angle rate, a roll angle, or a roll angle rate of the vehicle 100 and/or the trailer 102. For example, the parameter calculation circuitry 210 can calculate the at least one of the yaw angle, the yaw angle rate, the pitch angle, the pitch angle rate, the roll angle, or the roll angle rate based on the load data from the load sensors 108A and/or the trailer hitch sensor 108K, the acceleration data from the acceleration sensors 108G, the ride height data from the ride height sensors 108D, and/or the image data from the front camera 108I and/or the backup camera 108J.

In some examples, the parameters include a friction coefficient between the vehicle wheels 116 and an underlying road surface, and/or a surface type (e.g., icy, wet, dry, etc.) of the underlying road surface. For example, the parameter calculation circuitry 210 can determine the friction coefficient based on historical data stored in the vehicle database 218, where the historical data includes data collected by one or more second vehicles during travel along the projected path of the vehicle 100. In some examples, the parameter calculation circuitry 210 can determine the friction coefficient and/or the surface type by analyzing the image data captured by the front camera 108I, where the image data represents a surface of the road in a projected path of the vehicle 100. Additionally or alternatively, based on the image data, the parameter calculation circuitry 210 can detect upcoming curves and/or turns in the projected path of the vehicle 100 and/or determine a curvature (e.g., a radius) of the upcoming curves and/or turns. In some examples, the parameter calculation circuitry 210 detects road signs in the image data captured by the front camera 108I, and determines a threshold speed for the vehicle 100 based on the detected road signs. In some examples, based on image data captured by the backup camera 108J and/or based on data from the radar sensor 108C, the parameter calculation circuitry 210 estimates dimensions (e.g., a height, width, and/or length) of the trailer 102, and/or determines whether trailer sway of the trailer 102 is occurring (e.g., by monitoring a yaw angle of the trailer 102 relative to the vehicle 100 over multiple frames of the image data). In some examples, based on the image data from the backup camera 108J and/or based on data from the radar sensor 108C, the parameter calculation circuitry 210 determines a pitch angle of the trailer 102 relative to the vehicle 100 and/or determines a distance between the trailer 102 and the vehicle 100. In some examples, the parameter calculation circuitry 210 is instantiated by processor circuitry executing parameter calculation circuitry instructions and/or configured to perform operations such as those represented by the flowchart of FIG. 4.

The model control circuitry 212 accesses, trains, and/or re-trains one or more models to be used by the threshold determination circuitry 214. In some examples, the model control circuitry 212 access one or more speed threshold models generated and/or trained by the example training control circuitry 112 of FIG. 1 and provided to the model control circuitry 212 via the example network 114. In some examples, the model control circuitry 212 triggers training and/or re-training of the one or more speed threshold models periodically and/or in response to user input provided to the user interface 130. While the model control circuitry 212 is communicatively coupled to the training control circuitry 112 via the network 114 in this example, the training control circuitry 112 can be implemented in the speed control circuitry 106 and/or in the model control circuitry 212 in some examples. Generation, training, and/or re-training of the one or more speed threshold models by the training control circuitry 112 is described further below in connection with FIG. 3. In some examples, the model control circuitry 212 is instantiated by processor circuitry executing model control circuitry instructions and/or configured to perform operations such as those represented by the flowchart of FIG. 4.

The example threshold determination circuitry 214 determines a threshold speed (e.g., a maximum speed, a threshold speed range) for the vehicle 100 and/or the trailer 102. For example, the threshold determination circuitry 214 determines the threshold speed by executing the one or more speed threshold models based on the parameters determined by the parameter calculation circuitry 210 and/or based on sensor data and/or other input data obtained by the speed control circuitry 106. In some examples, the threshold speed corresponds to a speed at which trailer sway, understeer, and/or oversteer of the vehicle 100 and/or the trailer 102 is likely to occur. In some such examples, the vehicle 100 and/or the trailer 102 can be driven (e.g., manually and/or autonomously) at a speed less than the threshold speed to prevent the trailer sway, understeer, and/or oversteer of the vehicle 100 and/or the trailer 102 from occurring. In some examples, the threshold speed corresponds to a threshold speed range, where the vehicle 100 and/or the trailer 102 are to travel at or above a first threshold (e.g., a lower threshold) and at or below a second threshold (e.g., an upper threshold).

In some examples, the one or more speed threshold models executed by the threshold determination circuitry 214 can include a linear regression model. In some examples, features (e.g., polynomial coefficients) of the linear regression model are adjusted to fit the linear regression model to the historical data. For example, the linear regression model can be fitted (e.g., calibrated) based on reference data from the vehicle 100 and/or from one or more second vehicles and/or second trailers. In some examples, the reference data includes testing data resulting from field observations of different vehicles and/or different trailers coupled thereto. For example, the testing data can include input parameters such as vehicle capability (e.g., vehicle size, vehicle weight, vehicle horsepower, etc.), trailer dimensions (e.g., height, width, length, etc.), and/or trailer weight for different combinations of vehicles and trailers coupled thereto. In some examples, the input parameters can include environmental information associated with the different combinations of the vehicles and the trailers, where the environmental information includes traffic conditions, wind speed, wind direction, weather type, ambient temperature, surface conditions, etc. Further, in such examples, the reference data further includes output parameters determined and/or observed for the different combinations, where the output parameters can include speeds at which trailer sway, understeer, and/or oversteer for the respective combinations are observed. In some examples, the linear regression model is fitted (e.g., adjusted, calibrated) to predict the output parameters based on the corresponding input parameters.

In some examples, the one or more speed threshold models include a machine learning model. For example, the machine learning model can be a long short-term memory (LSTM) network model generated and/or trained by the training control circuitry 112. In some examples, the machine learning model is trained by the training control circuitry 112 to correlate the input parameters and the respective output parameters, and adjust one or more neural network parameters based on the correlation. As a result of the training, the machine learning model can be executed by the threshold determination circuitry 214 to determine the threshold speed for the vehicle 100 and/or the trailer 102. Generation and/or training of the machine learning model is described further below in connection with FIG. 3.

In some examples, the one or more speed threshold models (e.g., including the linear regression model and/or the machine learning model) are pre-loaded in the threshold determination circuitry 214. In some examples, the speed threshold model(s) can be re-trained periodically and/or as a result of new input data (e.g., new sensor data and/or new external input data) being provided to the speed control circuitry 106. In some examples, the new input data is weighted prior to training and/or re-training of the speed threshold models(s). For example, first sensor data obtained from the vehicle 100 and/or the trailer 102 can be weighted by a first value, and second sensor data from one or more second vehicles and/or one or more second trailers can be weighted by a second value different from the first value.

In some examples, the threshold determination circuitry 214 executes the one or more speed threshold models (e.g., including the linear regression model and/or the machine learning model) based on input data (e.g., the sensor data from the vehicle sensors 108 and/or the trailer sensors 110, external input data provided via the network 114, one or more parameters calculated by the parameter calculation circuitry 210, etc.) accessed and/or obtained by the speed control circuitry 106. As a result of the execution, the threshold determination circuitry 214 determines the threshold speed for the vehicle 100 and/or the trailer 102.

In some examples, the threshold determination circuitry 214 adjusts the determined threshold speed based on a detected condition of the vehicle 100 and/or the trailer 102. For example, the threshold determination circuitry 214 can adjust the threshold speed based on whether the vehicle 100 is operating in an autonomous driving mode or a manual driving mode. In some examples, the threshold determination circuitry 214 reduces (or increases) the threshold speed by an amount (e.g., a set value and/or a percentage) when the vehicle 100 switches from the manual driving mode to the autonomous driving mode, and increases (or reduces) the threshold speed by the amount when the vehicle 100 switches from the autonomous driving mode to the manual driving mode. Additionally or alternatively, the threshold determination circuitry 214 can adjust the threshold speed based on an environment of the vehicle 100 and/or the trailer 102. For example, the threshold determination circuitry 214 can reduce the threshold speed when the vehicle 100 is approaching a curve (e.g., detected based on the image data from the front camera 108I, GPS route data from the position sensors 108E, and/or a steering wheel angle detected by the steering sensor 108H). In such examples, the threshold determination circuitry 214 determines an offset (e.g., a percentage and/or a value) for the threshold speed based on a radius of the detected curve, a weight and/or a load on the trailer 102, and/or a friction coefficient between the vehicle 100 and an underlying surface (e.g., determined by the parameter calculation circuitry 210). In some examples, the threshold determination circuitry 214 reduces the threshold speed by the offset prior to the vehicle 100 and/or the trailer 102 traversing the curve. In some examples, the threshold determination circuitry 214 detects, based on the image data from the front camera 108I, one or more road signs corresponding to a projected path of the vehicle 100, and determines a speed limit for the projected path based on the detected road signs. In some such examples, when the threshold speed is above the speed limit, the threshold determination circuitry 214 adjusts (e.g., reduces) the threshold speed to at or below the speed limit. In some examples, the threshold determination circuitry 214 is instantiated by processor circuitry executing threshold determination circuitry instructions and/or configured to perform operations such as those represented by the flowchart of FIG. 4.

In some examples, the control activation circuitry 216 activates one or more vehicle controls based on the threshold speed. For example, the vehicle controls can include at least one of the vehicle motors 120, the vehicle brakes 118, the trailer motors 128, or the trailer brakes 126. In some examples, the control activation circuitry 216 activates (e.g., adjusts, engages) one or more of the vehicle controls to prevent the vehicle 100 and/or the trailer 102 from travelling at or above the threshold speed. For example, the control activation circuitry 216 can slow down the vehicle 100 and/or the trailer 102 to less than the threshold speed by activating at least one of the vehicle brakes 118 or the trailer brakes 126. In some examples, the control activation circuitry 216 prevents the vehicle 100 and/or the trailer 102 from travelling at or above the threshold speed by limiting a rotation speed of the vehicle motors 120 and/or the trailer motors 128. In some examples, the control activation circuitry 216 can activate a cruise control system of the vehicle 100 to cause the vehicle 100 and the trailer 102 to travel at a speed that is less than the threshold speed.

In some examples, an operator of the vehicle 100 can override the one or more vehicle controls. For example, the operator can provide user input to the user interface 130 and/or can engage one or more pedals (e.g., an accelerator pedal and/or a brake pedal) of the vehicle 100 to deactivate and/or override the one or more vehicle controls. In some such examples, the control activation circuitry 216 can deactivate the one or more vehicle controls based on user input obtained by the user interface control circuitry 208 and/or sensor data from the pedal sensor 108L obtained by the sensor interface circuitry 204. In some examples, in response to overriding and/or deactivating the one or more vehicle controls, the operator can drive the vehicle 100 and/or the trailer 102 at speeds that are at or above the threshold speed. In some examples, the control activation circuitry 216 is instantiated by processor circuitry executing control activation circuitry instructions and/or configured to perform operations such as those represented by the flowchart of FIG. 4.

Figure 3:
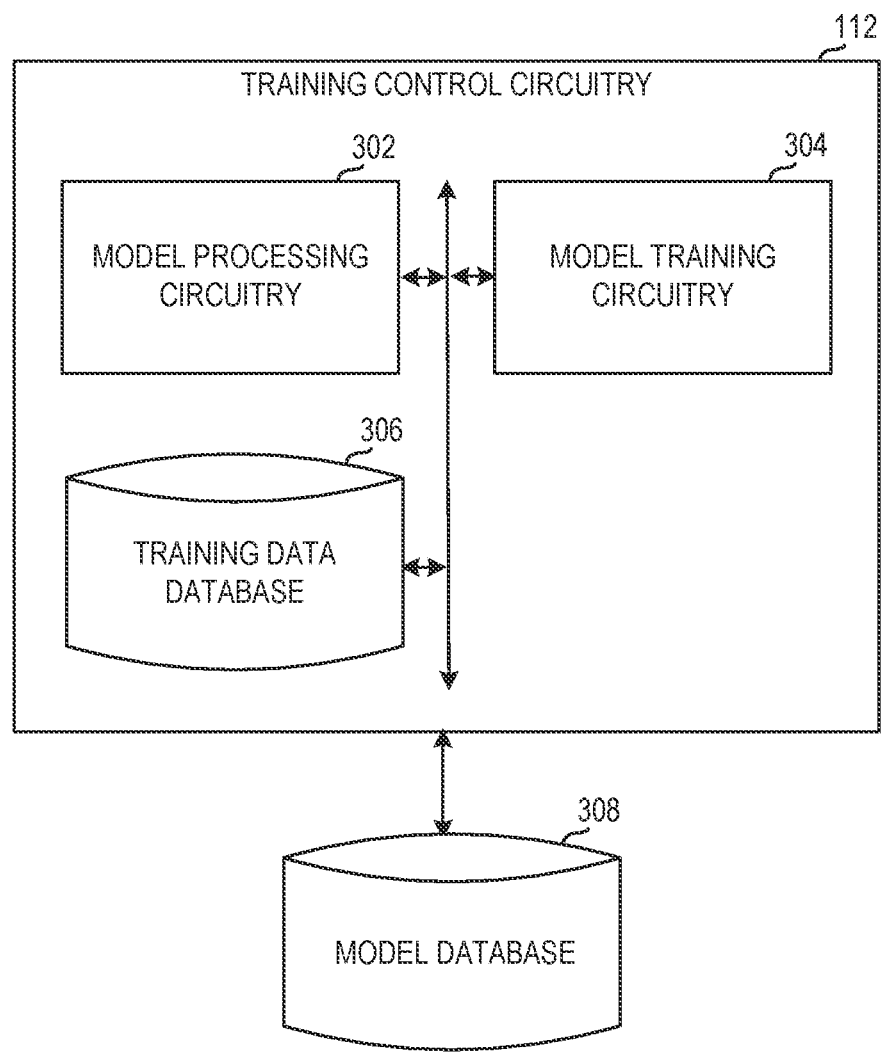
FIG. 3 is a block diagram of the example training control circuitry of FIG. 1.

FIG. 3 is a block diagram of the example training control circuitry 112 of FIG. 1 to train one or more models (e.g., linear regression models, machine learning models, neural network models) utilized by the speed control circuitry 106 of FIGS. 1 and/or 2. In particular, the training control circuitry 112 generates, trains, and/or stores one or more models (e.g., speed threshold model(s)) utilized by the speed control circuitry 106 of FIGS. 1 and/or 2 to determine a threshold speed for the vehicle 100 and/or the trailer 102. The training control circuitry 112 may be instantiated (e.g., creating an instance of, bring into being for any length of time, materialize, implement, etc.) by processor circuitry such as a central processing unit executing instructions. Additionally or alternatively, the training control circuitry 112 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

In the illustrated example of FIG. 3, the training control circuitry 112 includes example model processing circuitry 302, example model training circuitry 304, and an example training data database 306.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, machine learning models based on Long Short-Term Memory (LSTM) architectures are used. In general, machine learning models/architectures that are suitable to use in the example approaches disclosed herein will be convolutional neural networks (CNNs). However, other types of machine learning models could additionally or alternatively be used.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In some examples disclosed herein, ML/A models are trained using stochastic gradient descent. However, any other training algorithm may additionally or alternatively be used. In examples disclosed herein, training is performed until a targeted accuracy level is reached (e.g., >95%). Training is performed using hyperparameters that control how the learning is performed (e.g., a learning rate, a number of layers to be used in the machine learning model, etc.). In some examples, pre-trained model(s) are used. In some examples re-training may be performed. Such re-training may be performed in response to, for example, new sensor data being obtained by the speed control circuitry 106.

Training is performed using training data. In examples disclosed herein, the training data originates from reference data (e.g., historical data) including sensor data previously collected by the vehicle sensors 108 and/or the trailer sensors 110 of FIG. 1, typical speeds at which undesired behavior (e.g., trailer sway, understeer, and/or oversteer) occurs in observed vehicle and trailer combinations, vehicle parameters (e.g., vehicle dimensions, vehicle weight, vehicle horsepower) and/or trailer parameters (e.g., trailer dimensions, trailer shape, trailer weight) associated with the observed vehicle and trailer combinations, environmental information (e.g., traffic condition information, road curvature, weather type, ambient temperature, wind speed, wind direction, etc.) associated with the observed vehicle and trailer combinations, etc. In some examples, the speeds at which trailer sway for the observed vehicle and trailer combinations occurs can be correlated with the vehicle parameters, the trailer parameters, and/or the environmental information associated with the respective observed vehicle and trailer combinations. In some examples, the reference data may be obtained based on a threshold number (e.g., thousands) of observed vehicle and trailer combinations having different vehicle and/or trailer types, different geographic locations, etc. Because supervised training is used, the training data is labeled.

Once training is complete, the model is deployed for use as an executable construct that processes an input and provides an output based on the network of nodes and connections defined in the model. In examples disclosed herein, the model(s) are stored at one or more databases (e.g., an example model database 308 of FIG. 3, the vehicle database 218 of FIG. 2, etc.). The model(s) may then be executed by the threshold determination circuitry 214 of the speed control circuitry 106 of FIG. 2.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Referring to FIG. 3, the example model training circuitry 304 performs training of the model(s) (e.g., the neural network(s)) implemented by the model processing circuitry 302. In the example of FIG. 3, first training data can be stored in the training data database 306 and can include reference data including, for example, the sensor data from the vehicle sensors 108 and/or the trailer sensors 110, typical speeds at which trailer sway occurs in observed vehicle and trailer combinations, vehicle parameters (e.g., vehicle dimensions, vehicle weight, vehicle horsepower) and/or trailer parameters (e.g., trailer dimensions, trailer shape, trailer weight) associated with the observed vehicle and trailer combinations, environmental information (e.g., traffic condition information, road curvature, weather type, ambient temperature, wind speed, wind direction, etc.) associated with the observed vehicle and trailer combinations, etc.

The model training circuitry 304 trains the neural network(s) implemented by the model processing circuitry 302 using the first training data to output threshold speed(s) based on the vehicle parameters, the trailer parameters, the environmental information, etc. One or more speed threshold model(s) are generated as a result of the neural network training. The speed threshold model(s) are stored in the vehicle database 218 that is accessible by the speed control circuitry 106. In some examples, the speed threshold model(s) are stored in a different database. The databases 218, 308 may be the same storage device or different storage devices.

In some examples, the speed control circuitry 106 includes means for obtaining input data. For example, the means for obtaining input data may be implemented by the input interface circuitry 202 of FIG. 2. In some examples, the input interface circuitry 202 may be instantiated by processor circuitry such as the example processor circuitry 612 of FIG. 6. For instance, the input interface circuitry 202 may be instantiated by the example microprocessor 800 of FIG. 8 executing machine executable instructions such as those implemented by at least blocks 402, 406, 422 of FIG. 4. In some examples, the input interface circuitry 202 may be instantiated by hardware logic circuitry, which may be implemented by an ASIC, XPU, or the FPGA circuitry 900 of FIG. 9 structured to perform operations corresponding to the machine readable instructions. Additionally or alternatively, the input interface circuitry 202 may be instantiated by any other combination of hardware, software, and/or firmware. For example, the input interface circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the speed control circuitry 106 includes means for obtaining sensor data. For example, the means for obtaining sensor data may be implemented by the sensor interface circuitry 204 of FIG. 2. In some examples, the sensor interface circuitry 204 may be instantiated by processor circuitry such as the example processor circuitry 612 of FIG. 6. For instance, the sensor interface circuitry 204 may be instantiated by the example microprocessor 800 of FIG. 8 executing machine executable instructions such as those implemented by at least blocks 402, 404, 422 of FIG. 4. In some examples, the sensor interface circuitry 204 may be instantiated by hardware logic circuitry, which may be implemented by an ASIC, XPU, or the FPGA circuitry 900 of FIG. 9 structured to perform operations corresponding to the machine readable instructions. Additionally or alternatively, the sensor interface circuitry 204 may be instantiated by any other combination of hardware, software, and/or firmware. For example, the sensor interface circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the speed control circuitry 106 includes means for interfacing with a network. For example, the means for interfacing with a network may be implemented by the network communication circuitry 206 of FIG. 2. In some examples, the network communication circuitry 206 may be instantiated by processor circuitry such as the example processor circuitry 612 of FIG. 6. For instance, the network communication circuitry 206 may be instantiated by the example microprocessor 800 of FIG. 8 executing machine executable instructions such as those implemented by at least block 406 of FIG. 4. In some examples, the network communication circuitry 206 may be instantiated by hardware logic circuitry, which may be implemented by an ASIC, XPU, or the FPGA circuitry 900 of FIG. 9 structured to perform operations corresponding to the machine readable instructions. Additionally or alternatively, the network communication circuitry 206 may be instantiated by any other combination of hardware, software, and/or firmware. For example, the network communication circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the speed control circuitry 106 includes means for controlling a user interface. For example, the means for controlling the user interface may be implemented by the user interface control circuitry 208 of FIG. 2. In some examples, the user interface control circuitry 208 may be instantiated by processor circuitry such as the example processor circuitry 612 of FIG. 6. For instance, the user interface control circuitry 208 may be instantiated by the example microprocessor 800 of FIG. 8 executing machine executable instructions such as those implemented by at least blocks 406, 418 of FIG. 4. In some examples, the user interface control circuitry 208 may be instantiated by hardware logic circuitry, which may be implemented by an ASIC, XPU, or the FPGA circuitry 900 of FIG. 9 structured to perform operations corresponding to the machine readable instructions. Additionally or alternatively, the user interface control circuitry 208 may be instantiated by any other combination of hardware, software, and/or firmware. For example, the user interface control circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the speed control circuitry 106 includes means for calculating parameters. For example, the means for calculating parameters may be implemented by the parameter calculation circuitry 210 of FIG. 2. In some examples, the parameter calculation circuitry 210 may be instantiated by processor circuitry such as the example processor circuitry 612 of FIG. 6. For instance, the parameter calculation circuitry 210 may be instantiated by the example microprocessor 800 of FIG. 8 executing machine executable instructions such as those implemented by at least block 408 of FIG. 4. In some examples, the parameter calculation circuitry 210 may be instantiated by hardware logic circuitry, which may be implemented by an ASIC, XPU, or the FPGA circuitry 900 of FIG. 9 structured to perform operations corresponding to the machine readable instructions. Additionally or alternatively, the parameter calculation circuitry 210 may be instantiated by any other combination of hardware, software, and/or firmware. For example, the parameter calculation circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the speed control circuitry 106 includes means for controlling a model. For example, the means for controlling a model may be implemented by the model control circuitry 212 of FIG. 2. In some examples, the model control circuitry 212 may be instantiated by processor circuitry such as the example processor circuitry 612 of FIG. 6. For instance, the model control circuitry 212 may be instantiated by the example microprocessor 800 of FIG. 8 executing machine executable instructions such as those implemented by at least blocks 410, 412, 414 of FIG. 4. In some examples, the model control circuitry 212 may be instantiated by hardware logic circuitry, which may be implemented by an ASIC, XPU, or the FPGA circuitry 900 of FIG. 9 structured to perform operations corresponding to the machine readable instructions. Additionally or alternatively, the model control circuitry 212 may be instantiated by any other combination of hardware, software, and/or firmware. For example, the model control circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the speed control circuitry 106 includes means for determining a threshold. For example, the means for determining a threshold may be implemented by the threshold determination circuitry 214 of FIG. 2. In some examples, the threshold determination circuitry 214 may be instantiated by processor circuitry such as the example processor circuitry 612 of FIG. 6. For instance, the threshold determination circuitry 214 may be instantiated by the example microprocessor 800 of FIG. 8 executing machine executable instructions such as those implemented by at least block 416 of FIG. 4. In some examples, the threshold determination circuitry 214 may be instantiated by hardware logic circuitry, which may be implemented by an ASIC, XPU, or the FPGA circuitry 900 of FIG. 9 structured to perform operations corresponding to the machine readable instructions. Additionally or alternatively, the threshold determination circuitry 214 may be instantiated by any other combination of hardware, software, and/or firmware. For example, the threshold determination circuitry 214 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the speed control circuitry 106 includes means for activating at least one vehicle control. For example, the means for activating at least one vehicle control may be implemented by the control activation circuitry 216 of FIG. 2. In some examples, the control activation circuitry 216 may be instantiated by processor circuitry such as the example processor circuitry 612 of FIG. 6. For instance, the control activation circuitry 216 may be instantiated by the example microprocessor 800 of FIG. 8 executing machine executable instructions such as those implemented by at least block 420 of FIG. 4. In some examples, the control activation circuitry 216 may be instantiated by hardware logic circuitry, which may be implemented by an ASIC, XPU, or the FPGA circuitry 900 of FIG. 9 structured to perform operations corresponding to the machine readable instructions. Additionally or alternatively, the control activation circuitry 216 may be instantiated by any other combination of hardware, software, and/or firmware. For example, the control activation circuitry 216 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the training control circuitry 112 includes means for processing. For example, the means for processing may be implemented by the model processing circuitry 302 of FIG. 3. In some examples, the model processing circuitry 302 may be instantiated by processor circuitry such as the example processor circuitry 712 of FIG. 7. For instance, the model processing circuitry 302 may be instantiated by the example microprocessor 800 of FIG. 8 executing machine executable instructions such as those implemented by at least blocks 502, 504 of FIG. 5. In some examples, the model processing circuitry 302 may be instantiated by hardware logic circuitry, which may be implemented by an ASIC, XPU, or the FPGA circuitry 900 of FIG. 9 structured to perform operations corresponding to the machine readable instructions. Additionally or alternatively, the model processing circuitry 302 may be instantiated by any other combination of hardware, software, and/or firmware. For example, the model processing circuitry 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the training control circuitry 112 includes means for training. For example, the means for training may be implemented by the model training circuitry 304 of FIG. 3. In some examples, the model training circuitry 304 may be instantiated by processor circuitry such as the example processor circuitry 712 of FIG. 7. For instance, the model training circuitry 304 may be instantiated by the example microprocessor 800 of FIG. 8 executing machine executable instructions such as those implemented by at least blocks 506, 508, 510, 512 of FIG. 5. In some examples, the model training circuitry 304 may be instantiated by hardware logic circuitry, which may be implemented by an ASIC, XPU, or the FPGA circuitry 900 of FIG. 9 structured to perform operations corresponding to the machine readable instructions. Additionally or alternatively, the model training circuitry 304 may be instantiated by any other combination of hardware, software, and/or firmware. For example, the model training circuitry 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the speed control circuitry 106 of FIG. 1 is illustrated in FIG. 2, one or more of the elements, processes, and/or devices illustrated in FIG. 2 may be combined, divided, re-arranged, omitted, eliminated, and/or implemented in any other way. Further, the example input interface circuitry 202, the example sensor interface circuitry 204, the example network communication circuitry 206, the example user interface control circuitry 208, the example parameter calculation circuitry 210, the example model control circuitry 212, the example threshold determination circuitry 214, the example control activation circuitry 216, the example vehicle database 218, and/or, more generally, the example speed control circuitry 106 of FIG. 1, may be implemented by hardware alone or by hardware in combination with software and/or firmware. Thus, for example, any of the example input interface circuitry 202, the example sensor interface circuitry 204, the example network communication circuitry 206, the example user interface control circuitry 208, the example parameter calculation circuitry 210, the example model control circuitry 212, the example threshold determination circuitry 214, the example control activation circuitry 216, the example vehicle database 218, and/or, more generally, the example speed control circuitry 106, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example speed control circuitry 106 of FIG. 1 may include one or more elements, processes, and/or devices in addition to, or instead of, those illustrated in FIG. 2, and/or may include more than one of any or all of the illustrated elements, processes and devices.

Figure 4:
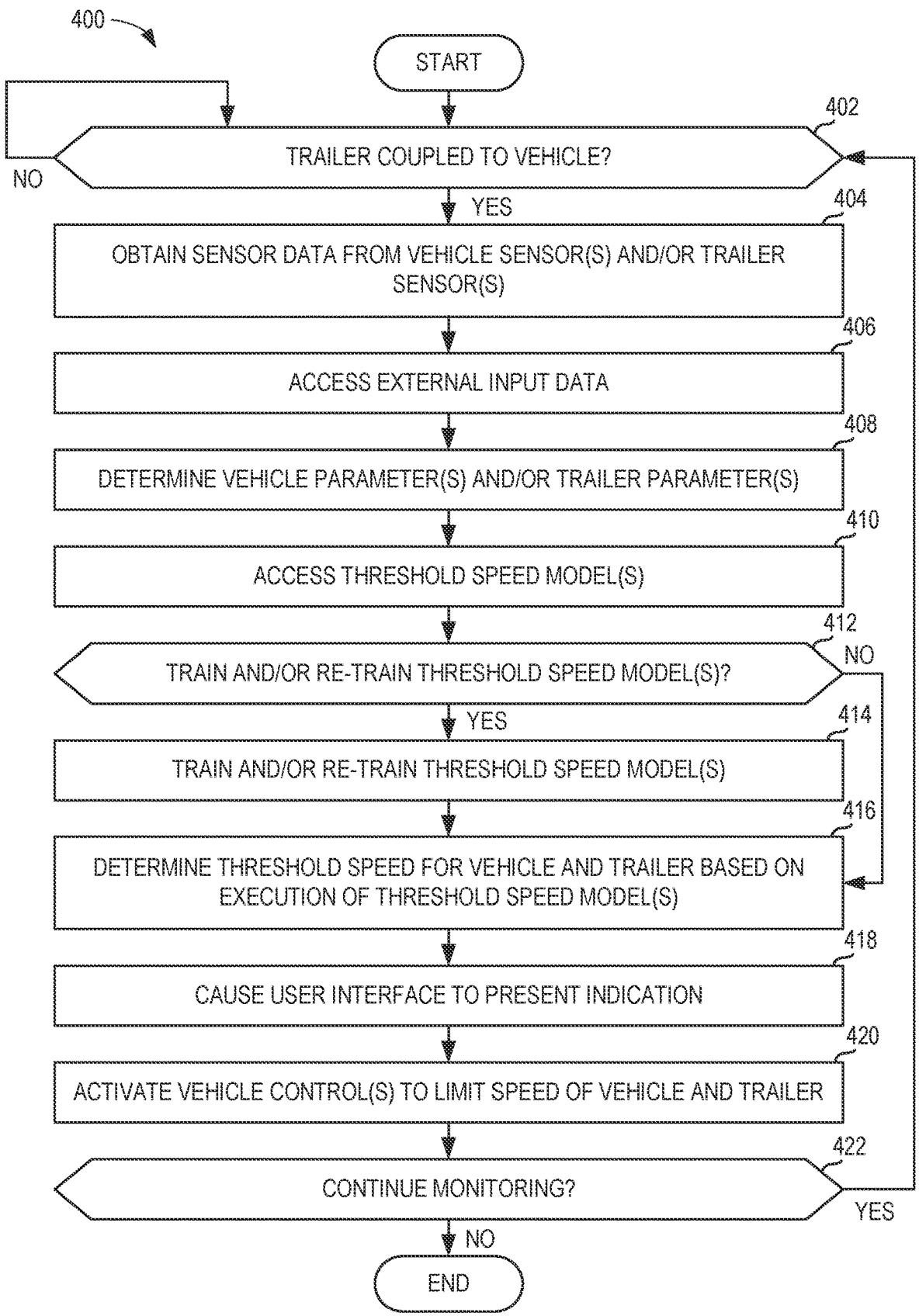
FIG. 4 is a flowchart representative of example machine readable instructions and/or example operations that may be executed by example processor circuitry to implement the example speed control circuitry of FIGS. 1 and/or 2.

A flowchart representative of example machine readable instructions, which may be executed to configure processor circuitry to implement the speed control circuitry 106 of FIG. 2, is shown in FIG. 4. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4, many other methods of implementing the example speed control circuitry 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

While an example manner of implementing the training control circuitry 112 of FIG. 1 is illustrated in FIG. 3, one or more of the elements, processes, and/or devices illustrated in FIG. 3 may be combined, divided, re-arranged, omitted, eliminated, and/or implemented in any other way. Further, the example model processing circuitry 302, the example model training circuitry 304, the example training data database 306, and/or, more generally, the example training control circuitry 112 of FIG. 1, may be implemented by hardware alone or by hardware in combination with software and/or firmware. Thus, for example, any of the example model processing circuitry 302, the example model training circuitry 304, the example training data database 306, and/or, more generally, the example training control circuitry 112, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example training control circuitry 112 of FIG. 1 may include one or more elements, processes, and/or devices in addition to, or instead of, those illustrated in FIG. 3, and/or may include more than one of any or all of the illustrated elements, processes and devices.

Figure 5:
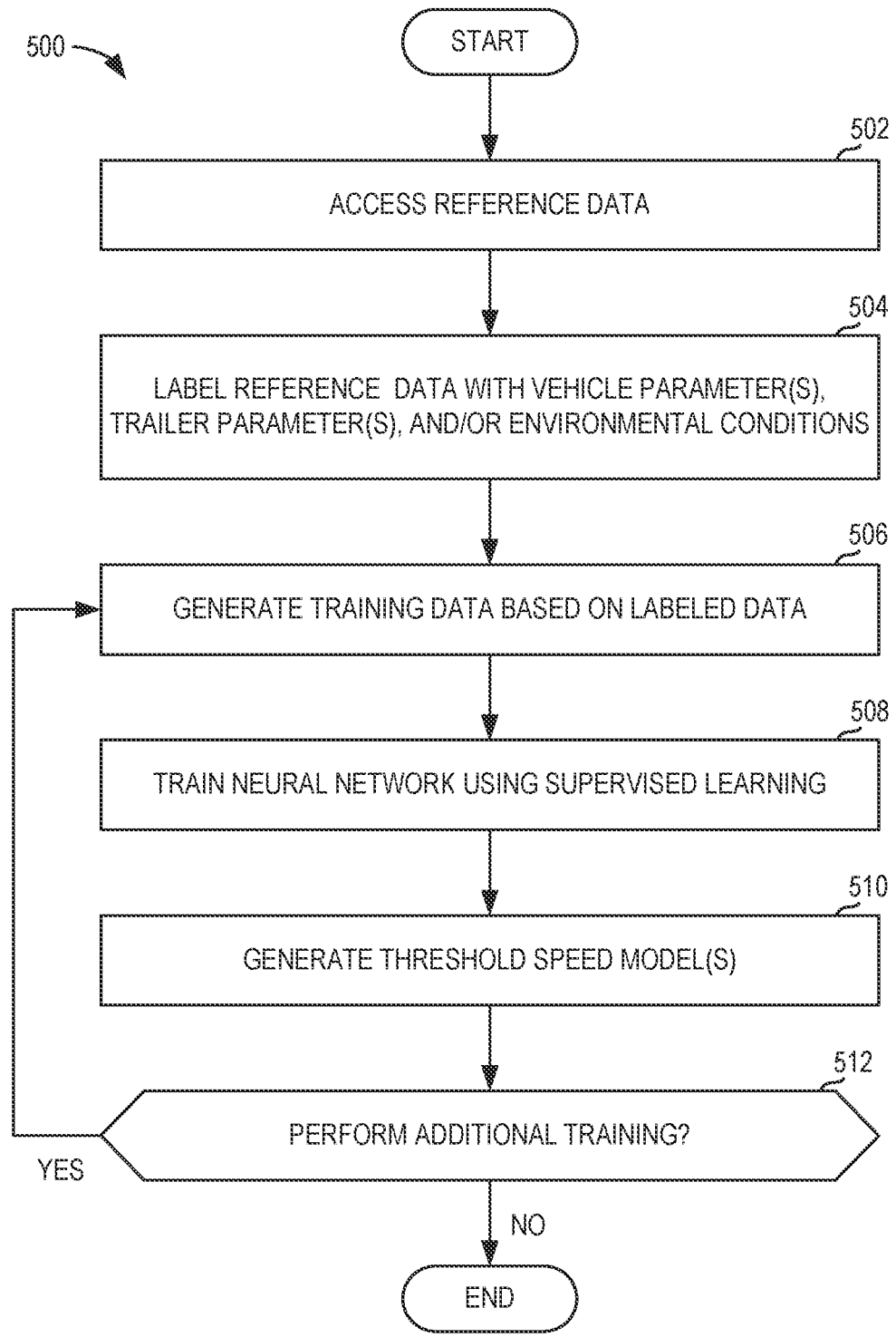
FIG. 5 is a flowchart representative of example machine readable instructions and/or example operations that may be executed and/or instantiated by the example training control circuitry of FIGS. 1 and/or 3 to generate and/or train one or more neural network models utilized by the example speed control circuitry of FIGS. 1 and/or 3.

A flowchart representative of example machine readable instructions, which may be executed to configure processor circuitry to implement the training control circuitry 112 of FIG. 3, is shown in FIG. 5. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 5, many other methods of implementing the example training control circuitry 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4 and/or 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by the example speed control circuitry 106 of FIGS. 1 and/or 2 to determine a threshold speed. The machine readable instructions and/or the operations 400 of FIG. 4 begin at block 402, at which the example speed control circuitry 106 determines whether the example trailer 102 is coupled to the example vehicle 100. For example, the example input interface circuitry 202 of FIG. 2 determines that the trailer 102 is coupled to the vehicle 100 in response to detecting that the example trailer harness 131 is coupled to the vehicle 100. In some examples, the sensor interface circuitry 204 determines that the trailer 102 is coupled to the vehicle 100 in response to the example trailer hitch sensor 108K of FIG. 1 measuring a load on the example vehicle tongue 132. Additionally or alternatively, the example user interface control circuitry 208 determines that the trailer 102 is coupled to the vehicle 100 in response to an operator of the vehicle 100 providing user input via the example user interface 130 of FIG. 1. In response to determining that the trailer 102 is not connected to the vehicle 100 (e.g., block 402 returns a result of NO), control returns to block 402. Alternatively, in response to determining that the trailer 102 is connected to the vehicle 100 (e.g., block 402 returns a result of YES), control proceeds to block 404.

At block 404, the example method 400 includes obtaining sensor data from one or more of the example vehicle sensors 108 and/or one or more of the example trailer sensors 110 of FIG. 1. For example, the example sensor interface circuitry 204 of FIG. 2 obtains and/or accesses the sensor data collected by the one or more vehicle sensors 108. In some examples, the example input interface circuitry 202 of FIG. 2 obtains, via the trailer harness 131, trailer sensor data collected by the one or more trailer sensors 110.

At block 406, the example method 400 includes accessing external input data. For example, the example network communication circuitry 206 of FIG. 2 accesses, via one or more network communications sent through the example network 114 of FIG. 1, the external input data from one or more second vehicles and/or from physical infrastructure (e.g., weather monitoring stations) communicatively coupled to the speed control circuitry 106. In some examples, the external input data can include one or more of traffic condition information (e.g., an average speed and/or a number of vehicles travelling on a particular stretch of road), weather type (e.g., rainy, sunny, snowy, etc.), ambient temperature, wind speed, wind direction, surface conditions, etc., associated with one or more geographic regions.

At block 408, the example method 400 includes determining one or more vehicle parameters and/or one or more trailer parameters. For example, the example parameter calculation circuitry 210 of FIG. 2 calculates the vehicle parameter(s) and/or the trailer parameter(s) based on input data (e.g., the sensor data and/or the external input data) obtained and/or accessed by the speed control circuitry 106. In some examples, the parameter calculation circuitry 210 calculates at least one of a yaw angle, a yaw angle rate, a pitch angle, a pitch angle rate, a roll angle, or a roll angle rate of the vehicle 100 and/or the trailer 102, and/or calculates a friction coefficient between the vehicle wheels 116 of the vehicle 100 and an underlying road surface. In some examples, the parameter calculation circuitry 210 calculates and/or estimates dimensions (e.g., height, width, and/or length) of the trailer 102 based on the input data.

At block 410, the example method 400 includes accessing one or more threshold speed models. For example, the example model control circuitry 212 of FIG. 2 accesses the threshold speed model(s) generated and/or trained by the example training control circuitry 112 of FIGS. 1 and/or 3. In some examples, the model control circuitry 212 accesses and/or retrieves the threshold speed model(s) from the example vehicle database 218 of FIG. 2.

At block 412, the example method 400 includes determining whether to train and/or re-train the one or more threshold speed models. For example, the model control circuitry 212 determines the threshold speed models are to be trained and/or re-trained periodically (e.g., after a duration) and/or in response to the speed control circuitry 106 obtaining new input data (e.g., new sensor data and/or new external input data). In response to the model control circuitry 212 determining that the threshold speed models do not require training and/or re-training (e.g., block 412 returns a result of NO), control proceeds to block 416. Alternatively, in response to the model control circuitry 212 determining that the threshold speed models are to be trained and/or re-trained (e.g., block 412 returns a result of YES), control proceeds to block 414.

At block 414, the example method 400 includes training and/or re-training the one or more threshold speed models. For example, the model control circuitry 212 trains and/or re-trains the threshold speed model(s) based on the new input data (e.g., the new sensor data and/or the new external input data) obtained by the speed control circuitry 106. In some examples, the model control circuitry 212 weights the new input data prior to the training and/or the re-training. In some examples, the model control circuitry 212 invokes the example training control circuitry 112 of FIGS. 1 and/or 3 to train and/or re-train the threshold speed model(s).

At block 416, the example method 400 includes determining a threshold speed for the vehicle 100 and the trailer 102 based on execution of the threshold speed model(s). For example, the example threshold determination circuitry 214 executes the threshold speed model(s) based on the sensor data and/or the external input data accessed and/or obtained by the speed control circuitry 106 and, as a result of execution of the threshold speed model(s), the threshold determination circuitry 214 determines the threshold speed. In some examples, the threshold determination circuitry 214 determines and/or adjusts the threshold speed based on environmental conditions (e.g., traffic conditions, weather type, ambient temperature, wind speed and/or direction, etc.), curvature of a projected path of the vehicle 100, and/or a driving mode (e.g., a manual driving mode and/or an autonomous driving mode) of the vehicle 100.

At block 418, the example method 400 includes causing the example user interface 130 of FIG. 1 to present an indication to an operator of the vehicle 100. For example, the example user interface control circuitry 208 of FIG. 2 can cause the user interface 130 to present at least one of a visual indication or an audio indication indicating the threshold speed to the operator. In some examples, when the vehicle 100 is in the manual driving mode, the indication instructs the operator to drive the vehicle 100 and/or the trailer 102 below the threshold speed.

At block 420, the example method 400 includes activating at least one vehicle control to limit a speed of the vehicle 100 and/or the trailer 102. For example, the example control activation circuitry 216 of FIG. 2 activates the at least one vehicle control to limit the speed of the vehicle 100 and/or the trailer 102 to below the threshold speed. Stated differently, the control activation circuitry 216 activates the at least one vehicle control to prevent the vehicle 100 and/or the trailer 102 from travelling at or above the threshold speed. In some examples, the control activation circuitry 216 is to activate the at least one vehicle control by activating at least one of the vehicle brakes 118, activating at least one of the trailer brakes 126, and/or limiting a rotation speed of at least one of the vehicle motors 120 or the trailer motors 128 of FIG. 1.

At block 422, the example method 400 includes determining whether to continue monitoring. For example, at least one of the example input interface circuitry 202, the example sensor interface circuitry 204, or the example user interface control circuitry 208 determines to continue monitoring when the vehicle 100 and/or trailer 102 are travelling and/or when new input data (e.g., new sensor data and/or new external input data) is accessed and/or obtained. In response to the at least one of the input interface circuitry 202, the sensor interface circuitry 204, or the user interface control circuitry 208 determining to continue monitoring (e.g., block 422 returns a result of YES), control returns to block 402. Alternatively, in response to the at least one of the input interface circuitry 202, the sensor interface circuitry 204, or the user interface control circuitry 208 determining not to continue monitoring (e.g., block 422 returns a result of NO), control ends.

FIG. 5 is a flowchart representative of example machine readable instructions and/or example operations 500 that may be executed and/or instantiated by the example training control circuitry 112 of FIGS. 1 and/or 3 to generate and/or train one or more models (e.g., neural network model(s), threshold speed model(s)) utilized by the example speed control circuitry 106 of FIGS. 1 and/or 2. The example instructions 500 of FIG. 5, when executed by the training control circuitry 112 of FIG. 3, result in a neural network and/or a model thereof (e.g., the threshold speed model(s)), that can be distributed to other computing systems, such as the model control circuitry 212 and/or the threshold determination circuitry 214 of the example speed control circuitry 106 of FIG. 2.

The machine readable instructions and/or the operations 500 of FIG. 5 begin at block 502, at which the example method 500 includes accessing reference data. For example, the example training control circuitry 112 accesses the reference data with respect to trailer sway, understeer, and/or oversteering behavior in different vehicle and trailer combinations. The example model processing circuitry 302 of FIG. 3 can access the reference data stored in the example training data database 306 of FIG. 3 and/or the example vehicle database 218 of FIG. 2. The reference data can include sensor data from the vehicle sensors 108 and/or the trailer sensors 110, typical speeds at which trailer sway occurs in observed vehicle and trailer combinations, vehicle parameters (e.g., vehicle dimensions, vehicle weight, vehicle horsepower) and/or trailer parameters (e.g., trailer dimensions, trailer shape, trailer weight) associated with the observed vehicle and trailer combinations, environmental information (e.g., traffic condition information, road curvature, weather type, ambient temperature, wind speed, wind direction, etc.) associated with the observed vehicle and trailer combinations, etc.

At block 504, the example method 500 includes labelling the reference data. For example, the example training control circuitry 112 labels the reference data with indications of vehicle parameter(s), trailer parameter(s), and/or environmental conditions associated with the observed vehicle and trailer combinations. For example, the model processing circuitry 302 labels the data to indicate the vehicle parameters (e.g., vehicle dimensions, vehicle weight, vehicle horsepower), the trailer parameters (e.g., trailer dimensions, trailer shape, trailer weight), and/or the environmental information (e.g., traffic condition information, road curvature, weather type, ambient temperature, wind speed, wind direction, etc.) in each of the observed vehicle and trailer combinations represented in the data. In some examples, the model processing circuitry 302 labels the data to indicate threshold speeds (e.g., speeds at which trailer sway, understeer, and/or oversteer are observed to occur) in each of the observed vehicle and trailer combinations represented in the data.

At block 506, the example method 500 includes generating training data based on the labeled data. For example, the example model training circuitry 304 of FIG. 3 generates the training data based on the labeled data.

At block 508, the example method 500 includes training one or more neural networks using the training data. For example, the model training circuitry 304 of FIG. 3 performs training of the neural network(s) based on supervised learning. As a result of the training, the threshold speed model(s) are generated at block 510. Based on the threshold speed model(s), the neural network(s) are trained to identify threshold speeds (e.g., speeds at which trailer sway, understeer, and/or oversteer are likely to occur) in different vehicle and trailer combinations. In some examples, the threshold speed model(s) are trained to predict the threshold speeds based on the vehicle parameters, the trailer parameters, and/or the environmental information associated with the different vehicle and trailer combinations. In some examples, the threshold speed model(s) can be stored in the vehicle database 218 of FIG. 2 for access by the threshold determination circuitry 214 of the example speed control circuitry 106 of FIG. 2.

At block 512, the example method 500 includes determining whether to perform additional training. For example, the model training circuitry 304 determines to perform additional training (and/or re-training) in response to a request received from the speed control circuitry 106 of FIG. 3 and/or in response to new reference data being obtained by the training control circuitry 112. In response to the model training circuitry 304 determining that additional training is to be performed (e.g., block 512 returns a result of YES), control returns to block 506. Alternatively, in response to the model training circuitry 304 determining that no additional training is to be performed (e.g., block 512 returns a result of NO), control ends.

Figure 6:
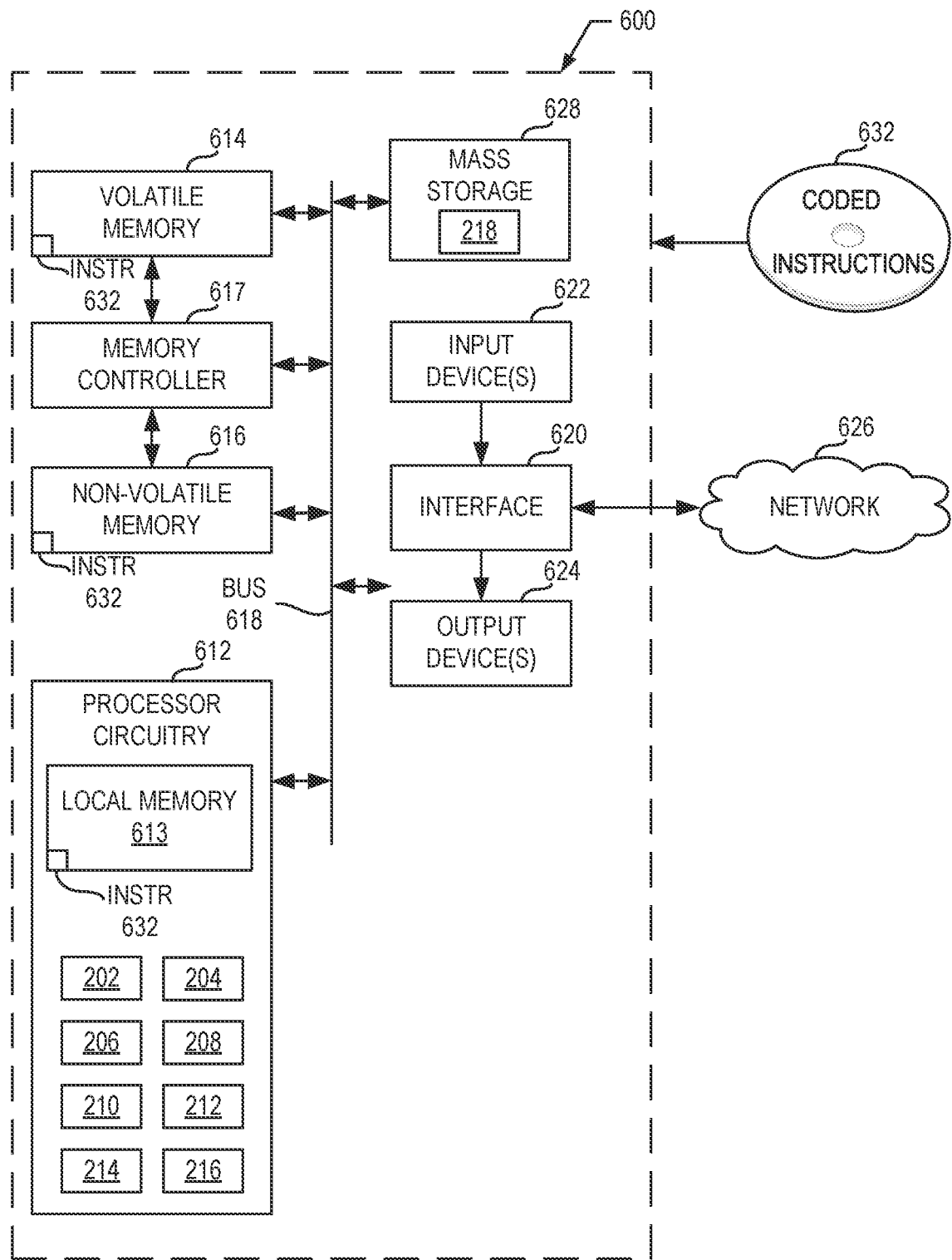
FIG. 6 is a block diagram of an example processing platform including processor circuitry structured to execute the example machine readable instructions and/or the example operations of FIG. 4 to implement the example speed control circuitry of FIGS. 1 and/or 2.

FIG. 6 is a block diagram of an example processor platform 600 structured to execute and/or instantiate the machine readable instructions and/or the operations of FIG. 4 to implement the speed control circuitry 106 of FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs, microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the example input interface circuitry 202, the example sensor interface circuitry 204, the example network communication circuitry 206, the example user interface control circuitry 208, the example parameter calculation circuitry 210, the example model control circuitry 212, the example threshold determination circuitry 214, and the example control activation circuitry 216.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 632, which may be implemented by the machine readable instructions of FIG. 4, may be stored in the mass storage device 628, in the volatile memory 614, in the non-volatile memory 616, and/or on a removable non-transitory computer readable storage medium such as a CD or DVD.

Figure 7:
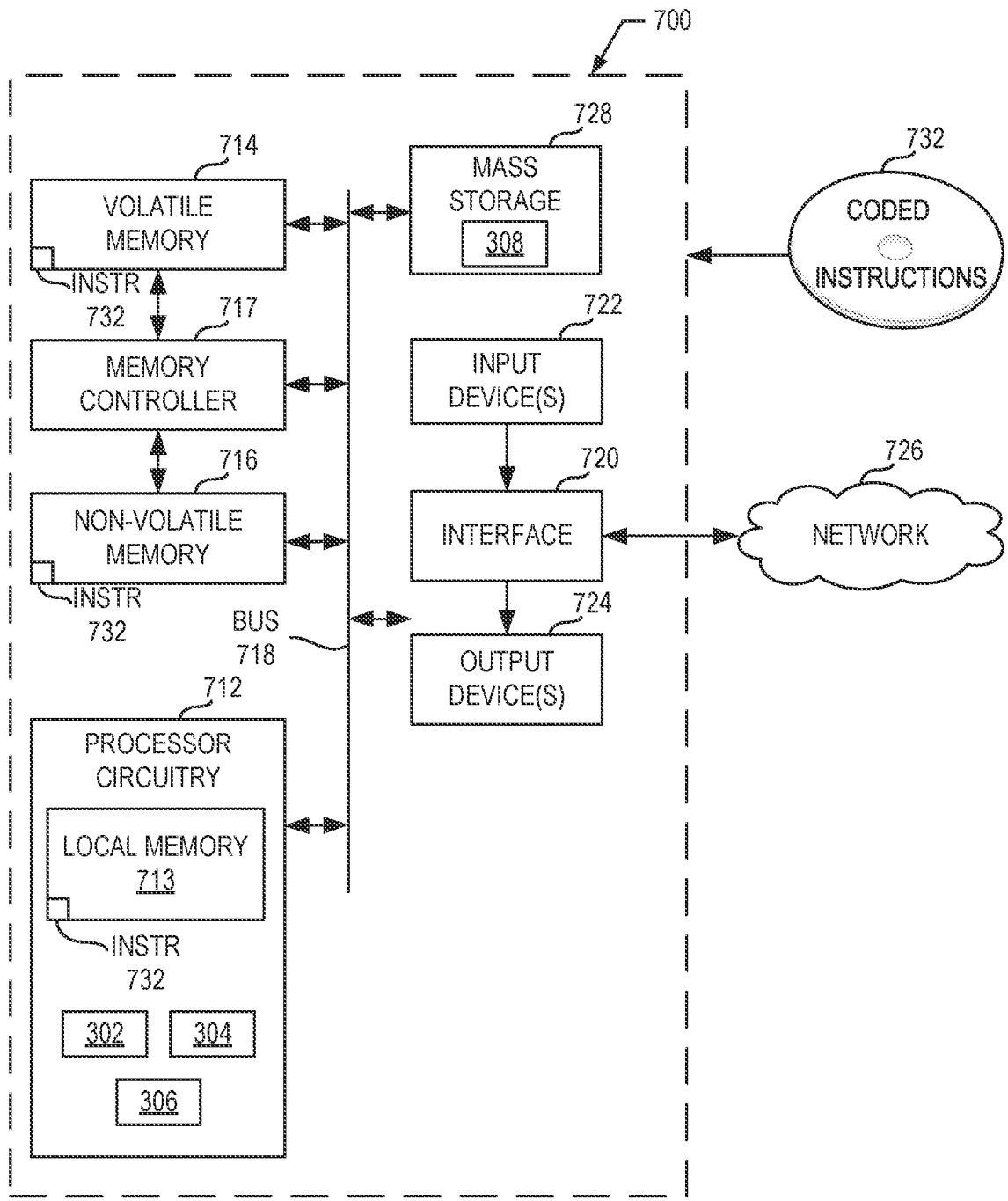
FIG. 7 is a block diagram of an example processing platform including processor circuitry structured to execute the example machine readable instructions and/or the example operations of FIG. 5 to implement the example training control circuitry of FIGS. 1 and/or 3.

FIG. 7 is a block diagram of an example processor platform 700 structured to execute and/or instantiate the machine readable instructions and/or the operations of FIG. 5 to implement the training control circuitry 112 of FIG. 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example model processing circuitry 302 and the example model training circuitry 304.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 732, which may be implemented by the machine readable instructions of FIG. 4, may be stored in the mass storage device 728, in the volatile memory 714, in the non-volatile memory 716, and/or on a removable non-transitory computer readable storage medium such as a CD or DVD.

Figure 8:
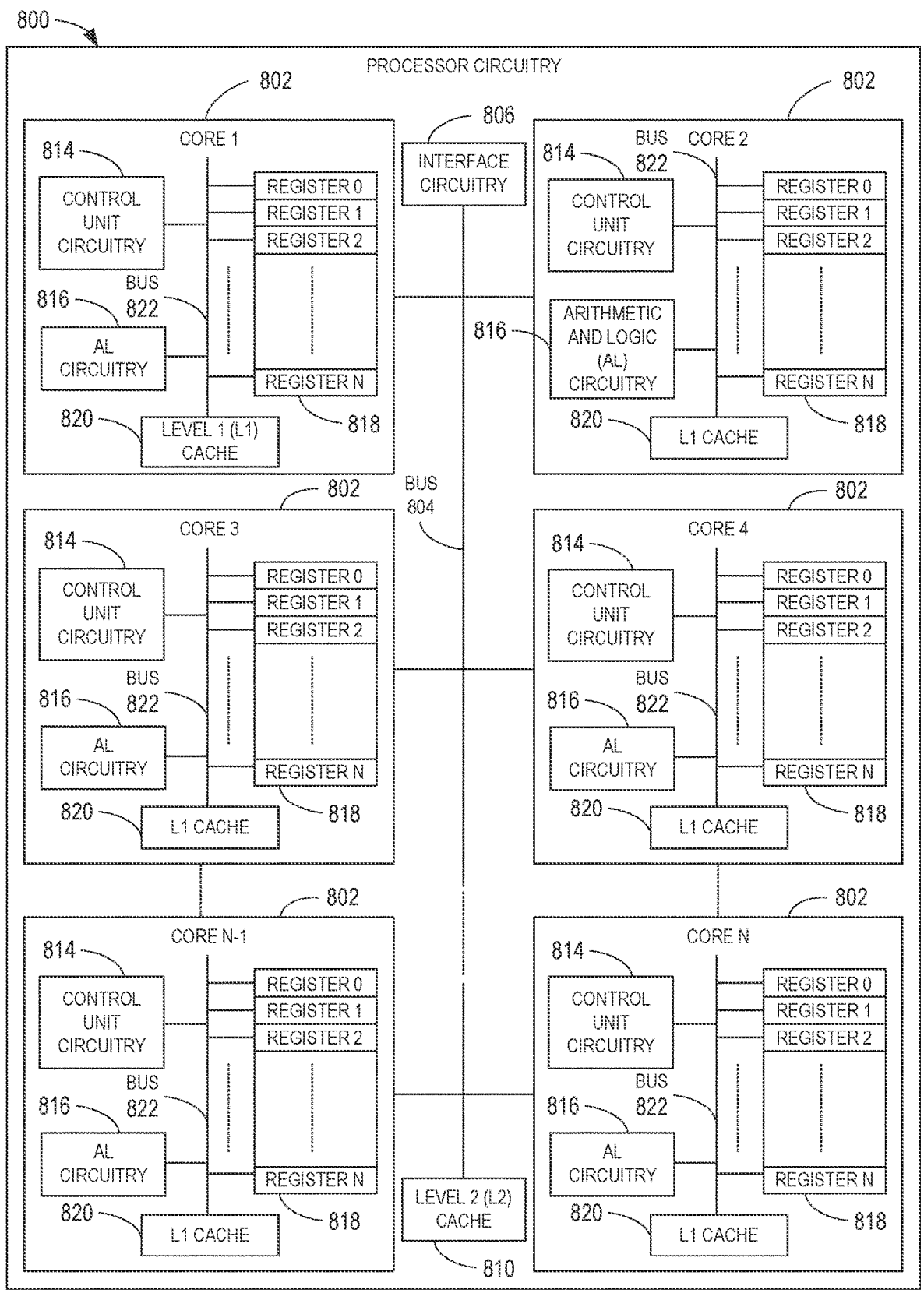
FIG. 8 is a block diagram of an example implementation of the processor circuitry of FIGS. 6 and/or 7.

FIG. 8 is a block diagram of an example implementation of the processor circuitry 612 of FIG. 6 and/or the processor circuitry 712 of FIG. 7. In this example, the processor circuitry 612 of FIG. 6 and/or the processor circuitry 712 of FIG. 7 is implemented by a microprocessor 800. For example, the microprocessor 800 may be a general purpose microprocessor (e.g., general purpose microprocessor circuitry). The microprocessor 800 executes some or all of the machine readable instructions of the flowcharts of FIGS. 4 and/or 5 to effectively instantiate the speed control circuitry 106 of FIG. 2 and/or the training control circuitry 112 of FIG. 3 as logic circuits to perform the operations corresponding to those machine readable instructions. In some such examples, the speed control circuitry 106 of FIG. 2 and/or the training control circuitry 112 of FIG. 3 is instantiated by the hardware circuits of the microprocessor 800 in combination with the instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 4 and/or 5.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 614, 616 of FIG. 6 and/or the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may be implemented by at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 6 is a block diagram of another example implementation of the processor circuitry 612 of FIG. 6 and/or the processor circuitry 712 of FIG. 7. In this example, the processor circuitry 612 and/or the processor circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

Figure 9:
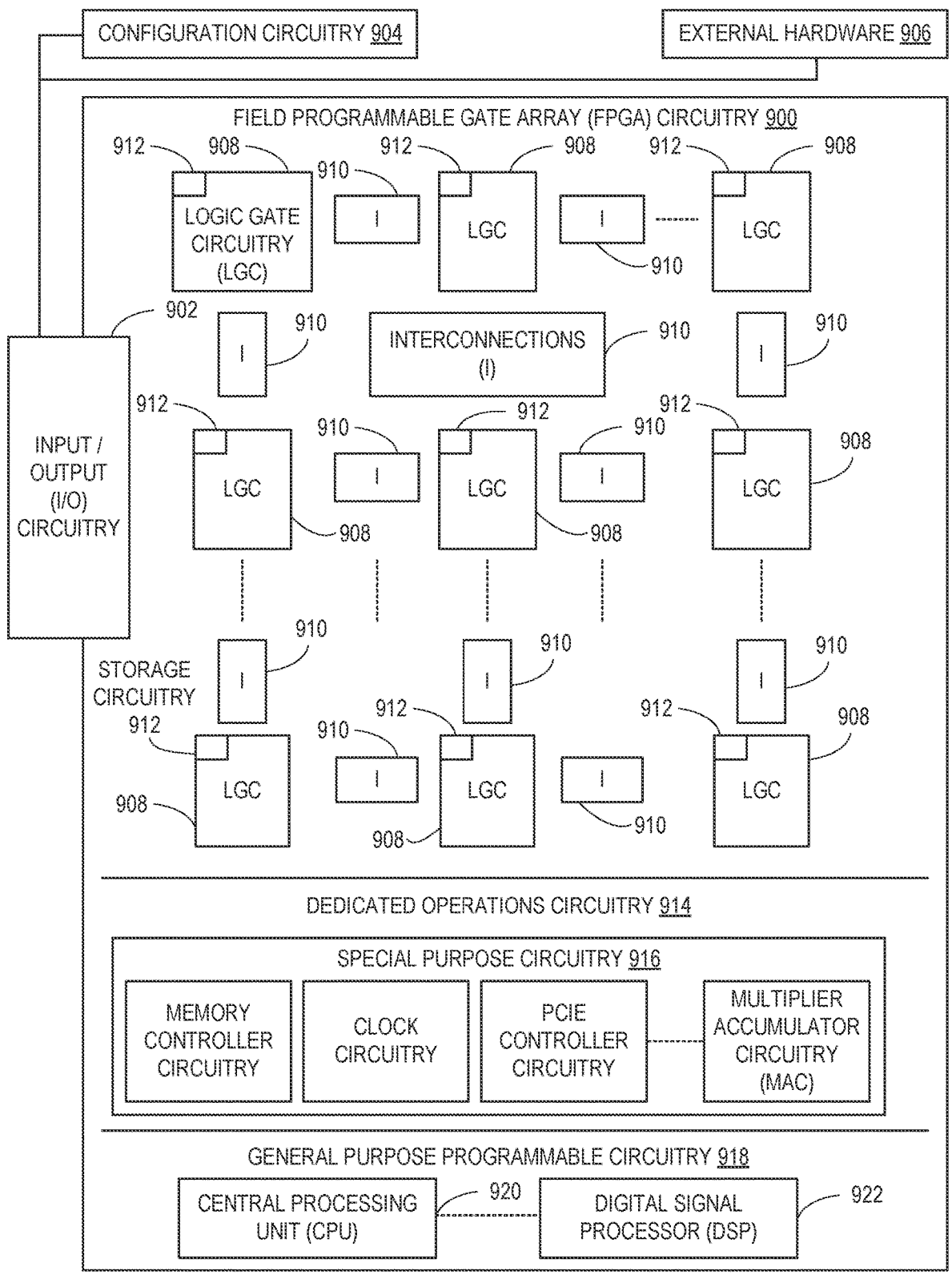
FIG. 9 is a block diagram of another example implementation of the processor circuitry of FIGS. 6 and/or 7.

More specifically, in contrast to the microprocessor 800 of FIG. 8 described above (which is a general purpose device that may be programmed to execute some or all of the machine readable instructions represented by the flowcharts of FIGS. 4 and/or 5 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 4 and/or 5. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 4 and/or 5. As such, the FPGA circuitry 900 may be structured to effectively instantiate some or all of the machine readable instructions of the flowcharts of FIGS. 4 and/or 5 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 4 and/or 5 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may be implemented by external hardware circuitry. For example, the external hardware 906 may be implemented by the microprocessor 800 of FIG. 8. The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations that may correspond to at least some of the machine readable instructions of FIGS. 4 and/or 5 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 612 of FIG. 6 and/or the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 612 of FIG. 6 and/or the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 4 and/or 5 may be executed by one or more of the cores 802 of FIG. 8, a second portion of the machine readable instructions represented by the flowcharts of FIGS. 4 and/or 5 may be executed by the FPGA circuitry 900 of FIG. 9, and/or a third portion of the machine readable instructions represented by the flowcharts of FIGS. 4 and/or 5 may be executed by an ASIC. It should be understood that some or all of the circuitry of FIGS. 2 and/or 3 may, thus, be instantiated at the same or different times. Some or all of the circuitry may be instantiated, for example, in one or more threads executing concurrently and/or in series. Moreover, in some examples, some or all of the circuitry of FIGS. 2 and/or 3 may be implemented within one or more virtual machines and/or containers executing on the microprocessor.

In some examples, the processor circuitry 612 of FIG. 6 and/or the processor circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the processor circuitry 612 of FIG. 6 and/or the processor circuitry 712 of FIG. 7, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that determine a threshold speed for a vehicle and a trailer. Disclosed systems, methods, apparatus, and articles of manufacture access input data (e.g., sensor data and/or other external input data) collected by sensors implemented by the vehicle, the trailer, and/or one or more second vehicles communicatively coupled to the vehicle. Examples disclosed herein execute one or more threshold speed models based on the input data and, as a result of the execution, determine a threshold speed for the vehicle and the trailer. In some examples disclosed herein, the threshold speed can be adjusted based on environmental conditions (e.g., a curvature of a projected path of the vehicle) and/or based on whether the vehicle is in a manual driving mode or an autonomous driving mode. Examples disclosed herein can instruct an operator of the vehicle, via one or more indications presented by a user interface of the vehicle, to drive the vehicle at a speed that is less than the threshold speed. Additionally or alternatively, examples disclosed herein activate one or more vehicle controls (e.g., a vehicle brake, a vehicle motor, a trailer brake, and/or a trailer motor) to prevent the vehicle and the trailer from travelling at or above the threshold speed. By preventing the vehicle and the trailer from travelling at or above the threshold speed, examples disclosed herein prevent and/or reduce occurrence of some vehicle and/or trailer behaviors (e.g., trailer sway, understeer, and/or oversteer). Advantageously, by determining and/or adjusting the threshold speed based on current sensor data and/or environmental conditions of the vehicle, disclosed systems, methods, apparatus, and articles of manufacture improve the efficiency of using a computing device by preventing premature and/or unnecessary activation of the at least one vehicle controls, thus preserving power. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to determine threshold speed for a vehicle and a trailer are disclosed herein. Further examples and combinations thereof include the following:

Example 1 includes an apparatus comprising memory, instructions, and programmable circuitry to execute the instructions to access information associated with at least one of a vehicle or a trailer coupled to the vehicle, determine, by executing a model based on the information, a threshold speed for the vehicle and the trailer, and prevent, by activating at least one vehicle control, the vehicle and the trailer from travelling at or above the threshold speed.

Example 2 includes the apparatus of example 1, wherein the model is a long short-term memory network model preloaded in the programmable circuitry.

Example 3 includes the apparatus of example 1, wherein the vehicle is a first vehicle, the model is a linear regression model calibrated based on historical data from at least one of the first vehicle or one or more second vehicles.

Example 4 includes the apparatus of example 1, wherein the threshold speed corresponds to a speed at which a trailer sway condition of the trailer is likely to occur.

Example 5 includes the apparatus of example 1, wherein the programmable circuitry is to cause a user interface of the vehicle to present an indication to an operator of the vehicle, the indication including at least one of a visual indication or an audio indication to indicate the threshold speed to the operator.

Example 6 includes the apparatus of example 1, wherein the programmable circuitry is to obtain, via a network communication, environmental information associated with a geographic region of the vehicle and the trailer, the programmable circuitry to determine the threshold speed based on the environmental information.

Example 7 includes the apparatus of example 6, wherein the environmental information includes at least one of traffic conditions, weather type, ambient temperature, wind speed, or wind direction associated with the geographic region.

Example 8 includes the apparatus of example 1, wherein the programmable circuitry is to adjust the threshold speed in response to the vehicle switching between a manual driving mode and an autonomous driving mode.

Example 9 includes the apparatus of example 1, wherein the programmable circuitry is to activate the at least one vehicle control by causing at least one of (a) a vehicle brake to engage a vehicle wheel of the vehicle, (b) a trailer brake to engage a trailer wheel of the trailer, (c) a vehicle motor to adjust acceleration of the vehicle, or (d) a trailer motor to adjust acceleration of the trailer.

Example 10 includes a non-transitory computer readable medium comprising instructions that, when executed, cause programmable circuitry to at least access information associated with at least one of a vehicle or a trailer coupled to the vehicle, determine, by executing a model based on the information, a threshold speed for the vehicle and the trailer, and prevent, by activating at least one vehicle control, the vehicle and the trailer from travelling at or above the threshold speed.

Example 11 includes the non-transitory computer readable medium of example 10, wherein the model is a long short-term memory network model preloaded in the programmable circuitry.

Example 12 includes the non-transitory computer readable medium of example 10, wherein the vehicle is a first vehicle, the model is a linear regression model calibrated based on historical data from at least one of the first vehicle or one or more second vehicles.

Example 13 includes the non-transitory computer readable medium of example 10, wherein the threshold speed corresponds to a speed at which a trailer sway condition of the trailer is likely to occur.

Example 14 includes the non-transitory computer readable medium of example 10, wherein the instructions are to cause the programmable circuitry to cause a user interface of the vehicle to present an indication to an operator of the vehicle, the indication including at least one of a visual indication or an audio indication to indicate the threshold speed to the operator.

Example 15 includes the non-transitory computer readable medium of example 10, wherein the instructions are to cause the programmable circuitry to obtain, via a network communication, environmental information associated with a geographic region of the vehicle and the trailer, the programmable circuitry to determine the threshold speed based on the environmental information.

Example 16 includes the non-transitory computer readable medium of example 15, wherein the environmental information includes at least one of traffic conditions, weather type, ambient temperature, wind speed, or wind direction associated with the geographic region.

Example 17 includes the non-transitory computer readable medium of example 10, wherein the instructions are to cause the programmable circuitry to adjust the threshold speed in response to the vehicle switching between a manual driving mode and an autonomous driving mode.

Example 18 includes the non-transitory computer readable medium of example 10, wherein the instructions are to cause the programmable circuitry to activate the at least one vehicle control by causing at least one of (a) a vehicle brake to engage a vehicle wheel of the vehicle, (b) a trailer brake to engage a trailer wheel of the trailer, (c) a vehicle motor to adjust acceleration of the vehicle, or (d) a trailer motor to adjust acceleration of the trailer.

Example 19 includes a method comprising accessing, by executing an instruction with programmable circuitry, information associated with at least one of a vehicle or a trailer coupled to the vehicle, determining, by executing a model based on the information, a threshold speed for the vehicle and the trailer, and preventing, by activating at least one vehicle control, the vehicle and the trailer from travelling at or above the threshold speed.

Example 20 includes the method of example 19, wherein the model is a long short-term memory network model preloaded in the programmable circuitry.

Example 21 includes the method of example 19, wherein the vehicle is a first vehicle, the model is a linear regression model calibrated based on historical data from at least one of the first vehicle or one or more second vehicles.

Example 22 includes the method of example 19, wherein the threshold speed corresponds to a speed at which a trailer sway condition of the trailer is likely to occur.

Example 23 includes the method of example 19, further including causing a user interface of the vehicle to present an indication to an operator of the vehicle, the indication including at least one of a visual indication or an audio indication to indicate the threshold speed to the operator.

Example 24 includes the method of example 19, further including obtaining, via a network communication, environmental information associated with a geographic region of the vehicle and the trailer, the threshold speed determined based on the environmental information.

Example 25 includes the method of example 24, wherein the environmental information includes at least one of traffic conditions, weather type, ambient temperature, wind speed, or wind direction associated with the geographic region.

Example 26 includes the method of example 19, further including adjusting the threshold speed in response to the vehicle switching between a manual driving mode and an autonomous driving mode.

Example 27 includes the method of example 19, further including activating the at least one vehicle control by causing at least one of (a) a vehicle brake to engage a vehicle wheel of the vehicle, (b) a trailer brake to engage a trailer wheel of the trailer, (c) a vehicle motor to adjust acceleration of the vehicle, or (d) a trailer motor to adjust acceleration of the trailer.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   memory;
   instructions; and
   programmable circuitry to execute the instructions to:
     access information associated with at least one of a vehicle or a trailer coupled to the vehicle;
     access image data associated with a road;
     determine, by executing a model based on the information, a threshold speed for the vehicle and the trailer;
     reduce the threshold speed based on the image data; and
     prevent, by activating at least one vehicle control, the vehicle and the trailer from travelling at or above the threshold speed.

2. The apparatus of claim 1, wherein the model is a long short-term memory network model preloaded in the programmable circuitry.

3. The apparatus of claim 1, wherein the vehicle is a first vehicle, the model is a linear regression model calibrated based on historical data from at least one of the first vehicle or one or more second vehicles.

4. The apparatus of claim 1, wherein the threshold speed corresponds to a speed at which a trailer sway condition of the trailer is likely to occur.

5. The apparatus of claim 1, wherein the programmable circuitry is to cause a user interface of the vehicle to present an indication to an operator of the vehicle, the indication including at least one of a visual indication or an audio indication to indicate the threshold speed to the operator.

6. The apparatus of claim 1, wherein the programmable circuitry is to adjust the threshold speed in response to the vehicle switching between a manual driving mode and an autonomous driving mode.

7. The apparatus of claim 1, wherein the programmable circuitry is to activate the at least one vehicle control by causing at least one of (a) a vehicle brake to engage a vehicle wheel of the vehicle, (b) a trailer brake to engage a trailer wheel of the trailer, (c) a vehicle motor to adjust acceleration of the vehicle, or (d) a trailer motor to adjust acceleration of the trailer.

8. The apparatus of claim 1, wherein the programmable circuitry is to obtain, via a network communication, environmental information associated with a geographic region of the vehicle and the trailer, the programmable circuitry to determine the threshold speed based on the environmental information.

9. The apparatus of claim 8, wherein the environmental information includes at least one of traffic conditions, weather type, ambient temperature, wind speed, or wind direction associated with the geographic region.

10. A non-transitory computer readable medium comprising instructions that, when executed, cause programmable circuitry to at least:
    access information associated with at least one of a vehicle or a trailer coupled to the vehicle;
    access image data associated with a road;
    determine, by executing a model based on the information, a threshold speed for the vehicle and the trailer;
    reduce the threshold speed based on the image data; and
    prevent, by activating at least one vehicle control, the vehicle and the trailer from travelling at or above the threshold speed.

11. The non-transitory computer readable medium of claim 10, wherein the model is a long short-term memory network model preloaded in the programmable circuitry.

12. The non-transitory computer readable medium of claim 10, wherein the vehicle is a first vehicle, the model is a linear regression model calibrated based on historical data from at least one of the first vehicle or one or more second vehicles.

13. The non-transitory computer readable medium of claim 10, wherein the threshold speed corresponds to a speed at which a trailer sway condition of the trailer is likely to occur.

14. The non-transitory computer readable medium of claim 10, wherein the instructions are to cause the programmable circuitry to cause a user interface of the vehicle to present an indication to an operator of the vehicle, the indication including at least one of a visual indication or an audio indication to indicate the threshold speed to the operator.

15. The non-transitory computer readable medium of claim 10, wherein the instructions are to cause the programmable circuitry to obtain, via a network communication, environmental information associated with a geographic region of the vehicle and the trailer, the programmable circuitry to determine the threshold speed based on the environmental information.

16. A method comprising:
    accessing, by executing an instruction with programmable circuitry, information associated with at least one of a vehicle or a trailer coupled to the vehicle;
    accessing image data associated with a road;
    determining, by executing a model based on the information, a threshold speed for the vehicle and the trailer;
    reducing the threshold speed based on the image data; and
    preventing, by activating at least one vehicle control, the vehicle and the trailer from travelling at or above the threshold speed.

17. The method of claim 16, wherein the model is a long short-term memory network model preloaded in the programmable circuitry.

18. The method of claim 16, wherein the vehicle is a first vehicle, the model is a linear regression model calibrated based on historical data from at least one of the first vehicle or one or more second vehicles.

19. The method of claim 16, wherein the threshold speed corresponds to a speed at which a trailer sway condition of the trailer is likely to occur.

20. The method of claim 16, further including causing a user interface of the vehicle to present an indication to an operator of the vehicle, the indication including at least one of a visual indication or an audio indication to indicate the threshold speed to the operator.

* * * * *